United States Patent
Wang et al.

(10) Patent No.: US 9,598,620 B2
(45) Date of Patent: *Mar. 21, 2017

(54) ABRASIVE ARTICLES INCLUDING ABRASIVE PARTICLES OF SILICON NITRIDE

(71) Applicant: SAINT-GOBAIN CERAMICS & PLASTICS, INC., Worcester, MA (US)

(72) Inventors: Guan Wang, Worcester, MA (US); Vimal K. Pujari, Northboro, MA (US); Yves Boussant-Roux, Avignon (FR)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/598,860

(22) Filed: Jan. 16, 2015

(65) Prior Publication Data
US 2015/0128505 A1    May 14, 2015

Related U.S. Application Data

(63) Continuation of application No. 13/539,369, filed on Jun. 30, 2012, now Pat. No. 8,986,409.
(Continued)

(51) Int. Cl.
| | | |
|---|---|---|
| *C09K 3/14* | (2006.01) | |
| *B24D 3/14* | (2006.01) | |
| *B24D 11/00* | (2006.01) | |

(52) U.S. Cl.
CPC .......... *C09K 3/1409* (2013.01); *B24D 3/14* (2013.01); *B24D 11/001* (2013.01); *C09K 3/1418* (2013.01)

(58) Field of Classification Search
CPC ..... C04B 35/584; C04B 35/50; C04B 35/505; C04B 35/495; B24D 3/00; B24D 3/34;
(Continued)

(56) References Cited

U.S. PATENT DOCUMENTS

| 345,604 A | 7/1886 | Semper |
|---|---|---|
| 1,910,444 A | 5/1933 | Nicholson |

(Continued)

FOREIGN PATENT DOCUMENTS

| CA | 743715 A | 10/1966 |
|---|---|---|
| CA | 2423788 A1 | 7/2002 |

(Continued)

OTHER PUBLICATIONS

"Investigation of Shaped Abrasive Particles vol. 1: Review of U.S. Pat. No. 6,054,093 Apr. 25, 2000" © Apr. 2011, 5 pages.
(Continued)

*Primary Examiner* — Pegah Parvini
(74) *Attorney, Agent, or Firm* — Abel Law Group, LLP; Adam Keser

(57) ABSTRACT

An abrasive article includes a body having abrasive particles contained within a bond material. The abrasive particles can include a majority content of silicon nitride and a minority content of sintering material including at least two rare-earth oxide materials. In an embodiment, the rare-earth oxide materials can include $Nd_2O_3$ and $Y_2O_3$. In a particular embodiment, the abrasive particles comprise a content (wt %) of $Nd_2O_3$ that is greater than a content of $Y_2O_3$ (wt %).

18 Claims, 16 Drawing Sheets

Related U.S. Application Data

(60) Provisional application No. 61/503,479, filed on Jun. 30, 2011.

(58) Field of Classification Search
CPC ... B24D 3/02; B24D 3/14; C09K 3/14; C09K 3/1409
USPC .................................. 501/97.1, 132, 152
See application file for complete search history.

(56) References Cited

U.S. PATENT DOCUMENTS

| | | |
|---|---|---|
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Gluchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,957,886 A * | 9/1990 | Mathers .............. C04B 35/1115 501/127 |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Willkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |

(56) References Cited

U.S. PATENT DOCUMENTS

| | | | |
|---|---|---|---|
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,496,386 A * | 3/1996 | Broberg ............ B24D 3/002 51/295 |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,921,725 A | 7/1999 | Kashiwagi et al. |
| 5,924,917 A | 7/1999 | Benedict et al. |
| 5,946,991 A | 9/1999 | Hoopman |
| 5,975,987 A | 11/1999 | Hoopman et al. |
| 5,984,988 A | 11/1999 | Berg et al. |
| 5,989,301 A | 11/1999 | Laconto, Sr. et al. |
| 5,997,597 A | 12/1999 | Hagan |
| 6,001,759 A * | 12/1999 | Miyanaga ............ C04B 35/597 264/647 |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |

(56) References Cited

U.S. PATENT DOCUMENTS

| | | |
|---|---|---|
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,783,589 B2 | 7/2014 | Hart et al. |
| 8,852,643 B2 | 10/2014 | Gonzales et al. |
| 8,986,409 B2* | 3/2015 | Wang ............... B24D 3/14 51/307 |
| 9,017,439 B2 | 4/2015 | Yener et al. |
| 2001/0027623 A1 | 10/2001 | Rosenflanz |
| 2002/0026752 A1 | 3/2002 | Culler et al. |
| 2002/0084103 A1* | 7/2002 | Komatsu ............ C04B 35/584 174/255 |
| 2002/0151265 A1 | 10/2002 | Adefris |
| 2002/0160694 A1 | 10/2002 | Wood et al. |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0188369 A1* | 8/2008 | Osthols ............... C04B 35/597 501/87 |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |

(56) References Cited

U.S. PATENT DOCUMENTS

| | | |
|---|---|---|
| 2010/0201018 A1 | 8/2010 | Yoshioka et al. |
| 2010/0267543 A1* | 10/2010 | Becher .................. C04B 35/593 501/97.1 |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat Vinuesa et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0290147 A1 | 10/2014 | Seth et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0183089 A1 | 7/2015 | Iyengar |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0304760 A1 | 10/2016 | Bock et al. |
| 2016/0311081 A1 | 10/2016 | Culler et al. |
| 2016/0311084 A1 | 10/2016 | Culler et al. |

FOREIGN PATENT DOCUMENTS

| | | |
|---|---|---|
| CH | 685051 A5 | 3/1995 |
| CN | 1094079 A | 10/1994 |
| CN | 1134692 | 10/1996 |
| CN | 102123837 B | 7/2014 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B1 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| FR | 2354373 A1 | 1/1978 |
| GB | 986847 A | 3/1965 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |

(56) References Cited

FOREIGN PATENT DOCUMENTS

| | | |
|---|---|---|
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2002-038131 A | 2/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008194761 A | 8/2008 |
| JP | 4585991 B2 | 11/2010 |
| JP | 5238725 B2 | 7/2013 |
| JP | 5238726 B2 | 7/2013 |
| NL | 171464 B | 11/1982 |
| WO | 9402559 A1 | 2/1994 |
| WO | 95/03370 | 2/1995 |
| WO | 95/18192 A1 | 7/1995 |
| WO | 9520469 A1 | 8/1995 |
| WO | 96/27189 A1 | 9/1996 |
| WO | 9714536 A1 | 4/1997 |
| WO | 9906500 A1 | 2/1999 |
| WO | 99/38817 A1 | 8/1999 |
| WO | 9938817 A1 | 8/1999 |
| WO | 9954424 A1 | 10/1999 |
| WO | 01/14494 A1 | 3/2001 |
| WO | 02097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013/049239 A1 | 4/2013 |
| WO | 2013070576 A2 | 5/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/177446 A1 | 11/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |

OTHER PUBLICATIONS

Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., Journal of Materials Research, 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.
Wu, J. et al., Friction and Wear Properties of Kevlar Pulp Reinforced Epoxy.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.

(56) References Cited

OTHER PUBLICATIONS

Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
Winter Catalogue No. 5, Dressing tools, Winter diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.
DOW Machine Tool Accessories, Grinding & Surface Finishing, www.1mta.com, Nov. 2014, 72 pages.
International Search Report for Application No. PCT/US2012/045163, dated Jan. 7, 2013, 2 pages.
USPTO Patent Full-Text Search (search 1), Apr. 5, 2011, 1 page.
USPTO Patent Full-Text Search (search 2), Apr. 5, 2011, 2 pages.
USPTO Patent Full-Text Search (search 3), Apr. 5, 2011, 1 page.
USPTO Patent Full-Text Search (search 4), Apr. 5, 2011, 1 page.
USPTO Patent Full-Text Search, Apr. 25, 2011, 2 pages.

\* cited by examiner

ABRASIVE ARTICLES INCLUDING ABRASIVE PARTICLES OF SILICON NITRIDE

PRIORITY CLAIM AND CROSS-REFERENCE TO RELATED APPLICATIONS

This application is a continuation of U.S. Non-Provisional patent application Ser. No. 13/539,369 filed on Jun. 30, 2012, entitled "Abrasive Articles Including Abrasive Particles of Silicon Nitride," and naming Guan Wang et al. as inventors and claims priority to U.S. Provisional Patent Application No. 61/503,479 filed on Jun. 30, 2011, and entitled "Abrasive Articles Including Abrasive Particles of Silicon Nitride," and naming Guan Wang et al. as inventors, which is incorporated by reference herein in its entirety.

BACKGROUND

Field of the Disclosure

This disclosure, in general, relates to abrasive articles incorporating abrasive particles and more particularly, abrasive articles incorporating abrasive particles of silicon nitride.

Description of the Related Art

Abrasive articles, such as coated abrasives and bonded abrasives, are used in various industries to machine workpieces, such as by, grinding, or polishing. Machining utilizing abrasive articles spans a wide industrial scope from optics industries, automotive paint repair industries, to metal fabrication industries. In each of these examples, manufacturing facilities use abrasives to remove bulk material or affect surface characteristics of products. For example, abrasive articles, such as abrasive segments may be used when grinding, polishing, or finishing certain various types of workpieces, including, for example, metal, wood, or stone. However, the industry continues to demand improvements in abrasive technologies.

SUMMARY

In one aspect, an abrasive article includes a body having abrasive particles contained within a bond material. The abrasive particles can include a majority content of silicon nitride and a minority content of sintering material including at least two rare-earth oxide materials. In an embodiment, the rare-earth oxide materials can include $Nd_2O_3$ and $Y_2O_3$. In a particular embodiment, the abrasive particles comprise a content (wt %) of $Nd_2O_3$ that is greater than a content of $Y_2O_3$ (wt %).

In another aspect, an abrasive article includes a single-layered bonded abrasive tool having a substrate and a layer of bond material overlying a surface of the substrate. In an embodiment, the single-layered bonded abrasive tool can also include abrasive particles adhered within the bond material and attached to the surface of the substrate. The abrasive particles can comprise liquid-phase sintered silicon nitride.

In an additional aspect, a method includes forming a mixture of silicon nitride, at least two rare earth elements, and at least one sintering aid. In an embodiment, the at least two rare earth elements include $Nd_2O_3$ and $Y_2O_3$. The method also includes treating the mixture to form green particles and sintering the green particles to form abrasive particles.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
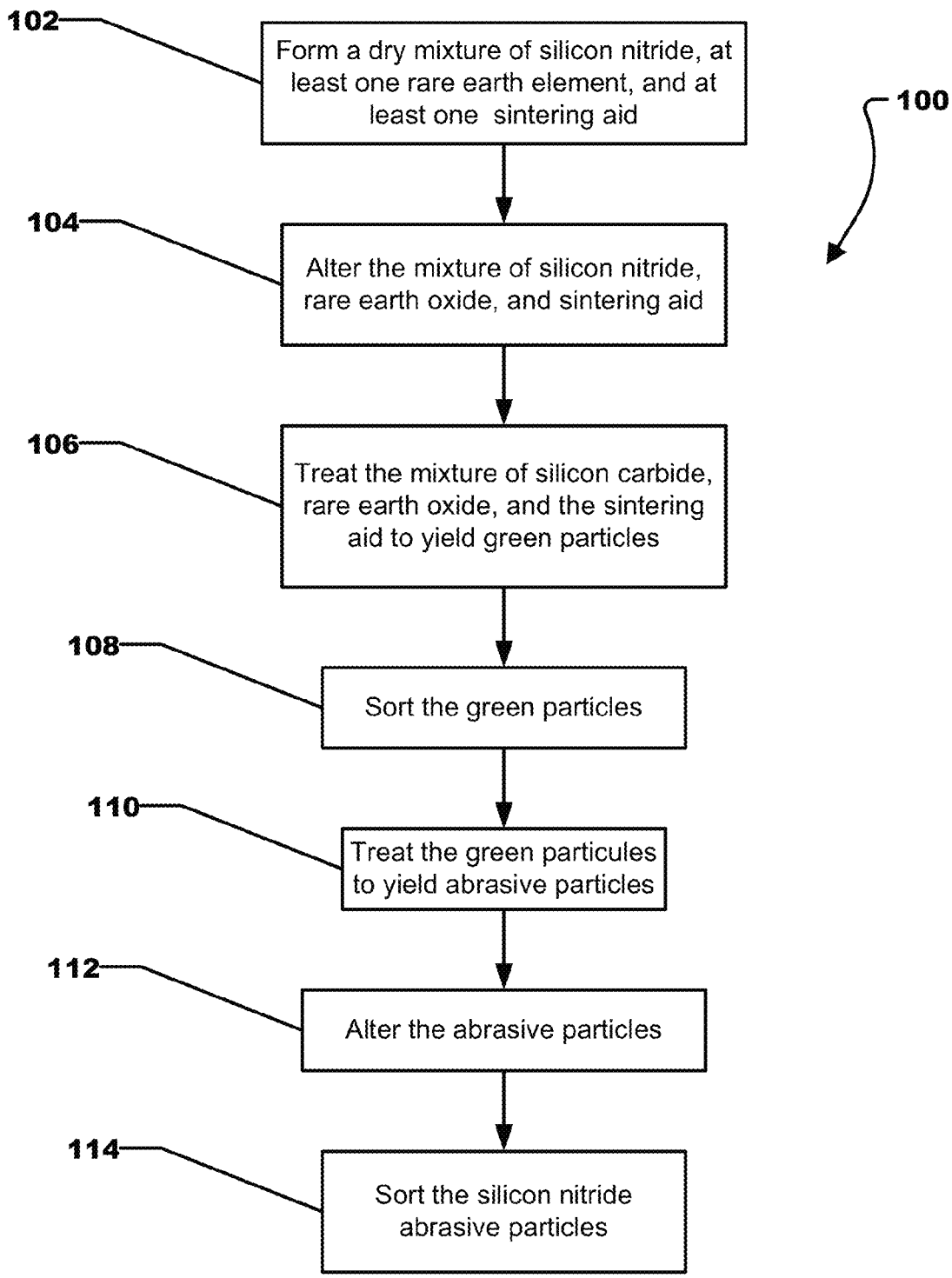
FIG. 1 includes a flow chart illustrating a method of making silicon nitride abrasive particles in accordance with an embodiment.

Referring initially to FIG. 1, a method of making silicon nitride abrasive particles is shown and is generally designated 100. The method 100 commences at 102 by forming a dry mixture including silicon nitride, at least one rare earth element, and at least one sintering aid in a mixer.

In a particular embodiment, the rare earth element may include a rare earth oxide. For example, the rare earth oxide may be selected from the group of $Y_2O_3$, $Nd_2O_3$, $La_2O_3$, and a combination thereof. Further, the rare earth oxide may include at least two different rare earth oxide compositions. For example, the mixture can include the rare earth oxides $Y_2O_3$ and $Nd_2O_3$, and particularly can consist essentially of $Y_2O_3$ and $Nd_2O_3$.

The sintering aid may include an oxide material. For example, the sintering aid may include $Al_2O_3$, MgO, $TiO_2$, and a combination thereof.

In an embodiment, the mixture can include other materials, such as AlN and TiC that aid in the formation of silicon nitride abrasive particles. In some instances, AlN can serve as an additional sintering aid and TiC can serve to strengthen the abrasive particles.

It will be appreciated that the sintering aid may be a powdered sintering aid. In an embodiment, an average particle size of the sintering aid can be at least about 0.8 microns, at least about 2 microns, or at least about 5 microns. In another embodiment, the average particle size of the sintering aid can be no greater than about 12 microns, no greater than about 10 microns, or no greater than about 7 microns. It will be appreciated that the average particle size of the sintering aid can be within a range between, or including, any of the minimum and maximum values noted above.

Additionally, the silicon nitride can be provided in the form of a powder. In one embodiment, the silicon nitride can include an average particle size of at least approximately 0.4 microns, at least approximately 1.1 microns, or at least approximately 1.7 microns. In another embodiment, the silicon nitride can include an average particle size of no greater than approximately 5.5 microns, no greater than approximately 3.9 microns, or no greater than approximately 2.5 microns. It will be appreciated that the average particle size of the silicon nitride can be within a range between, or including, any of the minimum and maximum sizes noted above. In a particular illustrative embodiment, the silicon nitride can include an average particle size within a range of approximately 0.4 microns to approximately 2 microns. Further, the silicon nitride can have a specific surface area of within a range of approximately 9 $m^2/g$ to approximately 13 $m^2/g$. In some instances, the silicon nitride powder can include impurities, such as oxygen, carbon, chlorine, iron, aluminum, and calcium. The impurities can be present in trace amounts.

In an embodiment, the mixture can include at least approximately 80 wt % silicon nitride powder for the total weight of the mixture, at least approximately 83 wt % silicon nitride powder for the total weight of the mixture, or at least approximately 86 wt % silicon nitride powder for the total weight of the mixture. In another embodiment, the mixture may include no greater than approximately 93 wt % for the total weight of the mixture, no greater than approximately 91 wt % for the total weight of the mixture, or no greater than approximately 88 wt % for the total weight of the mixture. It will be appreciated that the content of silicon nitride powder in the mixture can be within a range between, or including, any of the minimum and maximum sizes noted above.

In some instances, the mixture can include at least approximately 0.5 wt % of a rare earth oxide for the total weight of the mixture, at least approximately 3.1 wt % of a rare earth oxide for the total weight of the mixture, or at least approximately 5.8 wt % of a rare earth oxide for the total weight of the mixture. In other cases, the mixture may include no greater than approximately 15.8 wt % of a rare earth oxide for the total weight of the mixture, no greater than approximately 12.7 wt % of a rare earth oxide for the total weight of the mixture, no greater than approximately 9.3 wt % of a rare earth oxide for the total weight of the mixture, or no greater than approximately 7.6 wt % of a rare earth oxide for the total weight of the mixture. It will be appreciated that the content of a rare earth oxide in the mixture can be within a range between, or including, any of the minimum and maximum values noted above.

In certain situations, the mixture can include at least approximately 0.3 wt % of a sintering aid for the total weight of the mixture, at least approximately 2.6 wt % of a sintering aid for the total weight of the mixture, or at least approximately 5.2 wt % of a sintering aid for the total weight of the mixture. In other situations, the mixture can include no greater than approximately 13.2 wt % of a sintering aid for the total weight of the mixture, no greater than approximately 10.4 wt % of a sintering aid for the total weight of the mixture, or no greater than approximately 7.7 wt % of a sintering aid for the total weight of the mixture. It will be appreciated that the content of the sintering aid in the mixture can be within a range between, or including, any of the minimum and maximum values noted above.

In some embodiments, a total sintering aid content in the mixture can include one or more of the sintering aids noted previously, such as $Al_2O_3$, MgO, and $TiO_2$, one or more rare earth oxides, AlN, or a combination thereof. In a particular embodiment, the mixture can include a total sintering aid content of at least approximately 0.7 wt % for the total weight of the mixture, at least approximately 4.6 wt % for the total weight of the mixture, or at least approximately 7.2 wt % for the total weight of the mixture. In other cases, the mixture can include a total sintering aid content of no greater than approximately 16.4 wt % of a sintering aid for the total weight of the mixture, no greater than approximately 13.8 wt % of a sintering aid for the total weight of the mixture, no greater than approximately 9.3 wt % for the total weight of the mixture, or no greater than approximately 7.6 wt % for the total weight of the mixture. It will be appreciated that the total sintering aid content in the mixture can be within a range between, or including, any of the minimum and maximum values noted above. In a particular illustrative embodiment, the total sintering aid content for the mixture can be within a range of approximately 8 wt % to approximately 13 wt % for the total weight of the mixture.

At 104, the method 100 may include altering the mixture including the silicon nitride, the rare earth element, the sintering aid, and any other additional materials. The mixture of silicon nitride, the rare earth element, and the sintering aid may be altered by milling the mixture in a milling machine along with a liquid carrier.

The liquid carrier may include organic or inorganic materials. For example, in one embodiment, the liquid carrier can include water ($H_2O$). The liquid carrier may also include an alcohol, such as isopropyl alcohol (IPA). Specifically, in one embodiment, the liquid carrier may include at least 70 vol % $H_2O$, at least 75 vol % $H_2O$, or even at least 80 vol % $H_2O$ for the total volume of the mixture. Further, the liquid carrier may include not greater than 95 vol % $H_2O$, not greater than 90 vol % $H_2O$, or not greater than 85 vol % $H_2O$. It will be appreciated that the amount of $H_2O$ may be within a range between, or including, any of the minimum and maximum percentages noted above.

The liquid carrier may include at least 5 vol % IPA, at least 10 vol % IPA, at least 15 vol % IPA, or even at least 20 vol % IPA for the total volume of the mixture. The liquid carrier may include no greater than 30 vol % IPA or no greater than 25 vol % IPA. It will be appreciated that the amount of IPA may be within a range between, or including, any of the minimum and maximum percentages noted above.

The mixture may be milled to achieve a particular particle size. For example, milling can be conducted until the milled mixture has an average particle size of at least about 0.4 microns, at least about 0.6 microns, or at least about 0.8 microns. Further, the milled mixture can have an average particle size of no greater than about 1.4 microns, no greater than about 1.1 microns, or no greater than about 0.9 microns. It will be appreciated that the average particle size can be within a range between, or including, any of the minimum and maximum sizes noted above.

In an embodiment, the mixture can be milled to achieve particles with a specific surface area of about 8.8 m$^2$/g, at least about 10.4 m$^2$/g, or at least about 12.5 m$^2$/g. The mixture can also be milled to achieve particles with a specific surface area of no greater than about 15.3 m$^2$/g, no greater than about 13.9 m$^2$/g, or no greater than about 12.8 m2/g. It will be appreciated that the specific surface area of the particles of the mixture can be within a range between, or including, any of the minimum and maximum values noted above.

In certain situations, AlN can be added to the mixture before the milling process such that the AlN is milled along with the other materials of the mixture. In other situations, AlN can be added to the milled mixture.

Moving to 106, the method 100 may include treating the milled mixture to yield green particles. For example, treating the milled mixture may include the application of temperature, the application of pressure, the application of a chemical to facilitate a change in the milled mixture, or a combination thereof. The application of temperature may include a cooling process or a heating process. Further, treating the milled mixture may include sintering. However, according to one particular embodiment, treating the milled mixture may include freeze-drying the milled mixture.

In one embodiment, the freeze-drying can take place at a temperature of at least approximately −60° C., at least approximately −57° C., or at least approximately −55° C. In other situations, the freeze drying can take place at a temperature no greater than about −30° C., no greater than about −38° C., or no greater than about −45° C. It will be appreciated that the freeze drying process can take place within a range between, or including, any of the minimum and maximum values note above. In an illustrative embodiment, the freeze drying operation can take place at a temperature within a range of about −55° C. to about −45° C.

In additional embodiments, the freeze drying process can take place at a relative humidity no greater than about 18%, no greater than about 14%, no greater than about 8%, or no greater than about 4%.

Further, the freeze drying process can have a duration of at least about 1.2 hours, at least about 1.5 hours, or at least about 1.8 hours. In other cases, the freeze drying process can have a duration of no greater than about 2.8 hours, no greater than about 2.3 hours, or no greater than about 2.0 hours. It will be appreciated that the duration of the freeze drying process can be within a range between, or including, any of the minimum and maximum values noted above.

It can be appreciated that freeze-drying the milled mixture may result in particles that have a particular morphology. For example, the particles can be elongated or substantially acicular (i.e., needle shaped). The particles may have an aspect ratio of length:width of at least about 1.3, at least about 2:1, at least about 5:1, or at least about 10:1. Still, in certain instances, the aspect ratio may be no greater than about 65:1, no greater than about 40:1, no greater than about 20:1, no greater than about 15:1, or no greater than about 12:1. It will be appreciated that the aspect ratio can be within a range between, or including, any of the minimum and maximum ratios noted above.

In some instances, a length of the freeze-dried particles can be at least about 0.1 microns, at least about 1.2 microns, or at least about 2.3 microns. Additionally, a length of the freeze-dried particles can be no greater than about 5.7 microns, no greater than about 3.9 microns, or no greater than about 3.1 microns. It will be appreciated that the length of the freeze-dried particles can be within a range between, or including, any of the minimum and maximum sizes noted above. In a particular illustrative embodiment, the average length of the freeze-dried particles can be within a range of about 0.8 microns to about 1.4 microns.

In some embodiments, the width of the freeze-dried particles can be at least about 0.06 microns, at least about 0.2 microns, or at least about 0.6 microns. Further, the width of the freeze-dried particles may be no greater than about 1.4 microns, no greater than about 1.1 microns, or no greater than about 0.8 microns. It will be appreciated that the width of the freeze-dried particles can be within a range between, or including, any of the minimum and maximum sizes noted above. In a particular illustrative embodiment, the average width of the freeze-dried particles can be within a range of about 0.15 to about 0.40 microns.

After the treating process at 106, the method 100 may continue to 108 where the method 100 may include sorting the green particles. The sorting process undertaken at 108 may include sorting the green particles by size, shape, or a combination thereof. Further, the sorting process may include sieving the green particles.

In one embodiment, the green particles may be screened in order to sort the green particles into one or more different abrasive grit sizes using one or more mesh screens. In some aspects, the screening process can provide green particles having an average particle size of at least about 220 microns, at least about 300 microns, or at least about 370 microns. In other aspects, the screening process can provide green particles having an average particle size of no greater than about 580 microns, no greater than about 510 microns, or no greater than about 440 microns. It will be appreciated that the average particle size of the screened green particles is within a range between, or including, any of the minimum and maximum values noted above. In one particular illustrative embodiment, the average particle size of the screened green particles can be within a range of about 545 microns to about 400 microns. In another particular illustrative embodiment, the average particle size of the screened green particles can be within a range of about 250 microns to about 400 microns.

At 110, the method 100 may include treating the green particles to yield abrasive particles. For example, treating the green particles may include the application of temperature, the application of pressure, the application of a chemical to facilitate a physical change in the green particles, or a combination thereof. In one particular embodiment, treating the green particles may include sintering the green particles. Sintering can include a process of applying elevated temperatures to affect densification and grain growth in the green particles to yield sintered abrasive particles. In some instances, the sintering process can include a pressureless sintering process.

The green particles may be sintered at a temperature that is at least about 1600° C., at least about 1650° C., or at least about 1700° C. Further, the green particles may be sintered at a temperature greater no greater than about 1825° C., no greater than about 1780° C., or no greater than about 1750° C. It will be appreciated that the sintering temperature can be within a range between, or including, any of the minimum and maximum temperatures noted above.

In an embodiment, the green particles can be sintered for a duration of at least about 75 minutes, at least about 82 minutes, or at least about 90 minutes. In another embodiment, the green particles can be sintered for a duration of no greater than about 105 minutes, no greater than about 98 minutes, or no greater than about 93 minutes. It will be appreciated that the duration of the sintering operation can be within a range between, or including, any of the minimum and maximum temperatures noted above.

The green particles may be sintered in a particular sintering atmosphere. For example, the sintering atmosphere may comprise an inert gas including, for example, noble gases such as neon or argon, or alternatively an inert species such as nitrogen. A combination of such gases may be used. In other instances, the sintering atmosphere can include a reducing gas.

In another embodiment, the treating process, and more particularly, the sintering process may also include the application of elevated pressures to the green particles. For example, the green particles may be treated by hot isostatic pressing (HIPing) The green particles can be hot isostatically pressed at a temperature that is at least about 1730° C., at least about 1750° C., or at least about 1780° C. Further, the green particles may be hot isostatically pressed at a temperature no greater than about 1870° C., no greater than about 1840° C., or no greater than about 1800° C. It will be appreciated that the hot isostatic pressing temperature can be within a range between, or including, any of the minimum and maximum temperatures noted above.

Further, according to one embodiment, hot isostatic pressing of the green particles can be conducted for a duration of at least about 1.3 hours, at least about 1.6 hours, or even at least about 1.8 hours. In another embodiment, hot isostatic pressing of the green particles can be conducted for a duration no greater than about 2.6 hours, no greater than about 2.3 hours, or even no greater than about 2.0 hours. It will be appreciated that the hot isostatic pressing duration can be within a range between, or including, any of the minimum and maximum times noted above.

According to one embodiment, the green particles can undergo hot isostatic pressing at a particular pressure to facilitate the formation of abrasive particles according to the embodiments herein. For example the green particles can be hot isostatically pressed at a pressure of at least about 100 MPa, at least about 145 MPa, or at least about 180 MPa. Moreover, the green particles can be hot isostatically pressed at a pressure not greater than about 260 MPa, not greater than about 225 MPa, or not greater than about 205 MPa. It will be appreciated that the pressure can be within a range between, or including, any of the minimum and maximum pressures noted above.

At 112, the method 100 may include altering the abrasive particles. The abrasive particles may be altered by milling the mixture in a milling machine. In some embodiments, the milling process can include jet milling, a crushing operation, or a combination thereof.

After altering the abrasive particles at 112, the method 100 may continue to 114 where the method 100 may include sorting the abrasive particles. The sorting process undertaken at 114 may include sorting the abrasive particles by size, shape, or a combination thereof. Further, the sorting process may include sieving the silicon nitride abrasive particles.

In one embodiment, the abrasive particles may be screened in order to sort the abrasive particles into one or more different abrasive grit sizes using one or more mesh screens.

The abrasive particles can have an average particle size of at least about 5 microns, at least about 18 microns, or at least about 32 microns. Further, the abrasive particles can have an average particle size of no greater than about 300 microns, no greater than about 135 microns, no greater than about 75 microns, no greater than about 63 microns, or no greater than about 54 microns. It will be appreciated that the average particle size can be within a range between, or including, any of the minimum and maximum sizes noted above.

In some situations, the abrasive particles can have a theoretical density of at least about 85%, at least about 89%, or at least about 94%. In other instances, the abrasive particles can have a theoretical density no greater than about 99.5%, no greater than about 98%, or no greater than about 96%. It will be appreciated that the abrasive particles can have a theoretical density within a range between, or including, any of the minimum and maximum values noted above.

Figure 2:
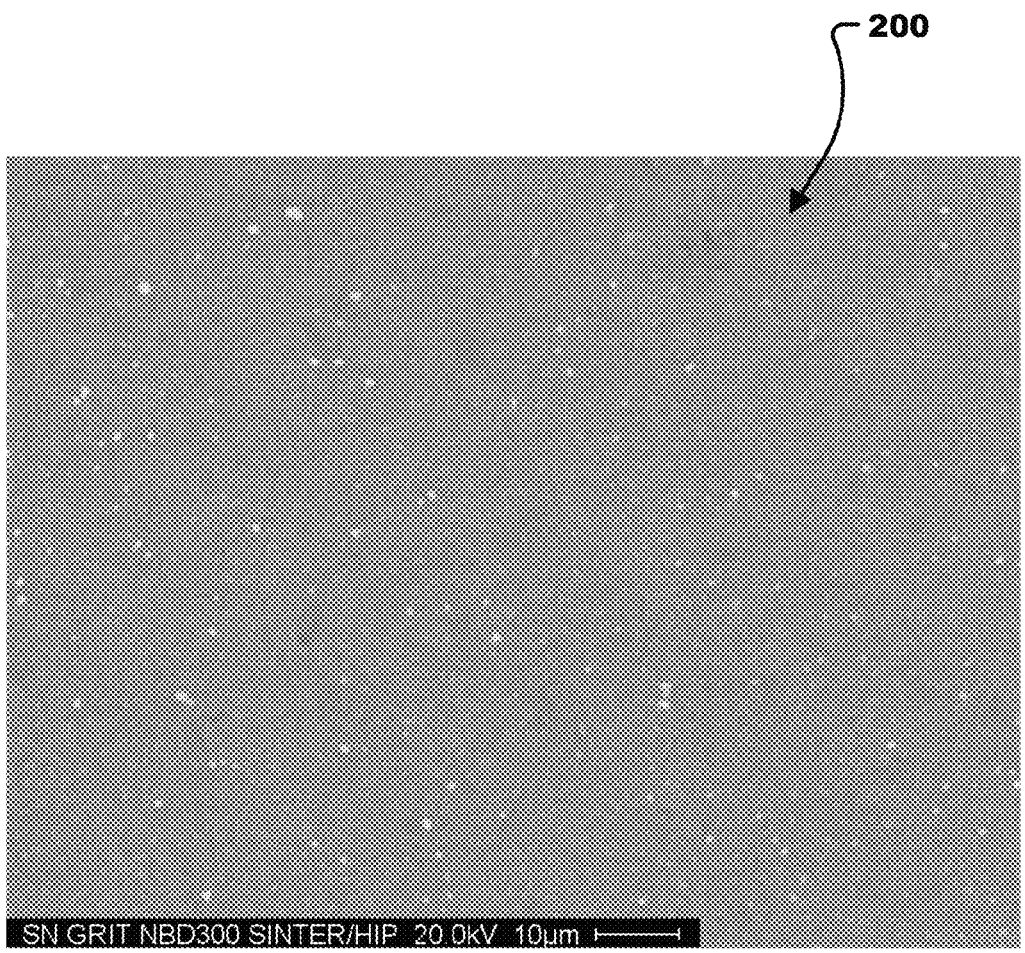
FIG. 2 includes a first scanning electron microscope (SEM) image of a portion of a silicon nitride abrasive particle in accordance with an embodiment.
Figure 3:
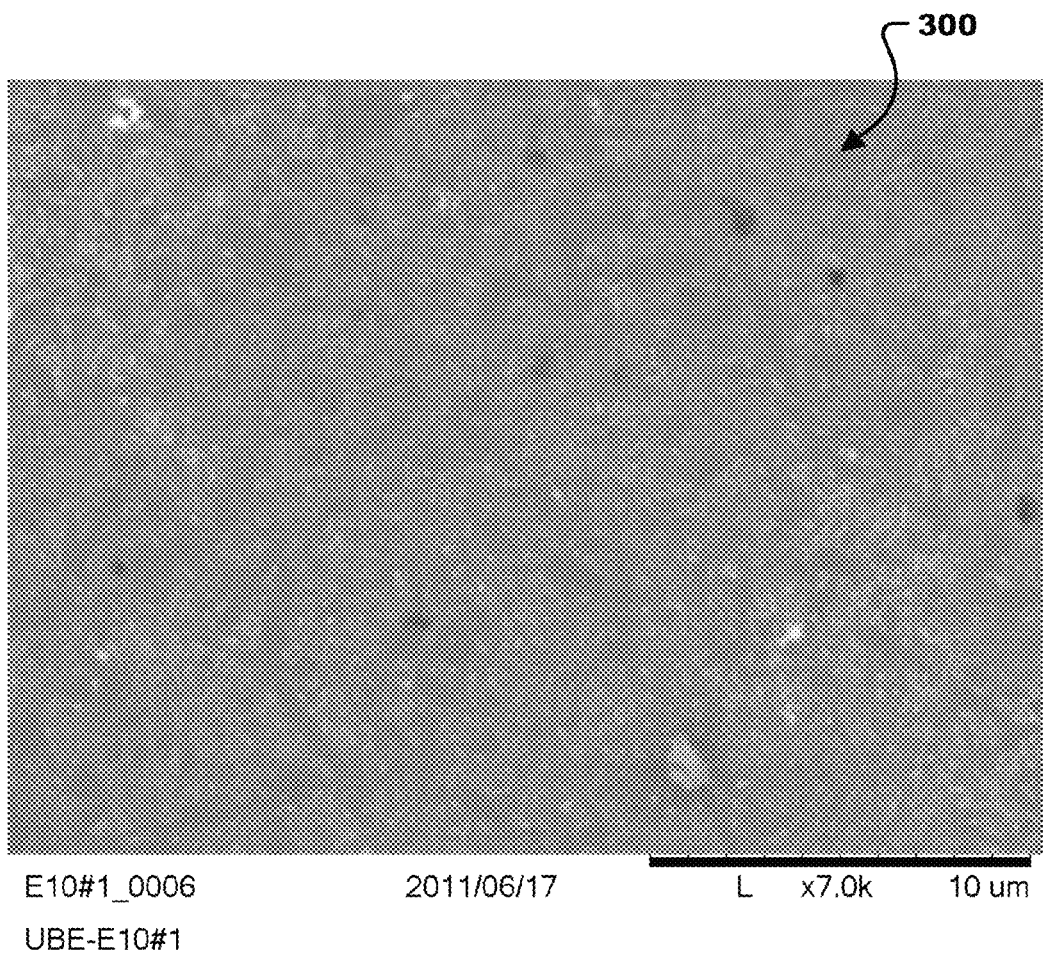
FIG. 3 includes a second SEM image of a portion of a silicon nitride abrasive particle in accordance with an embodiment.
Figure 4:
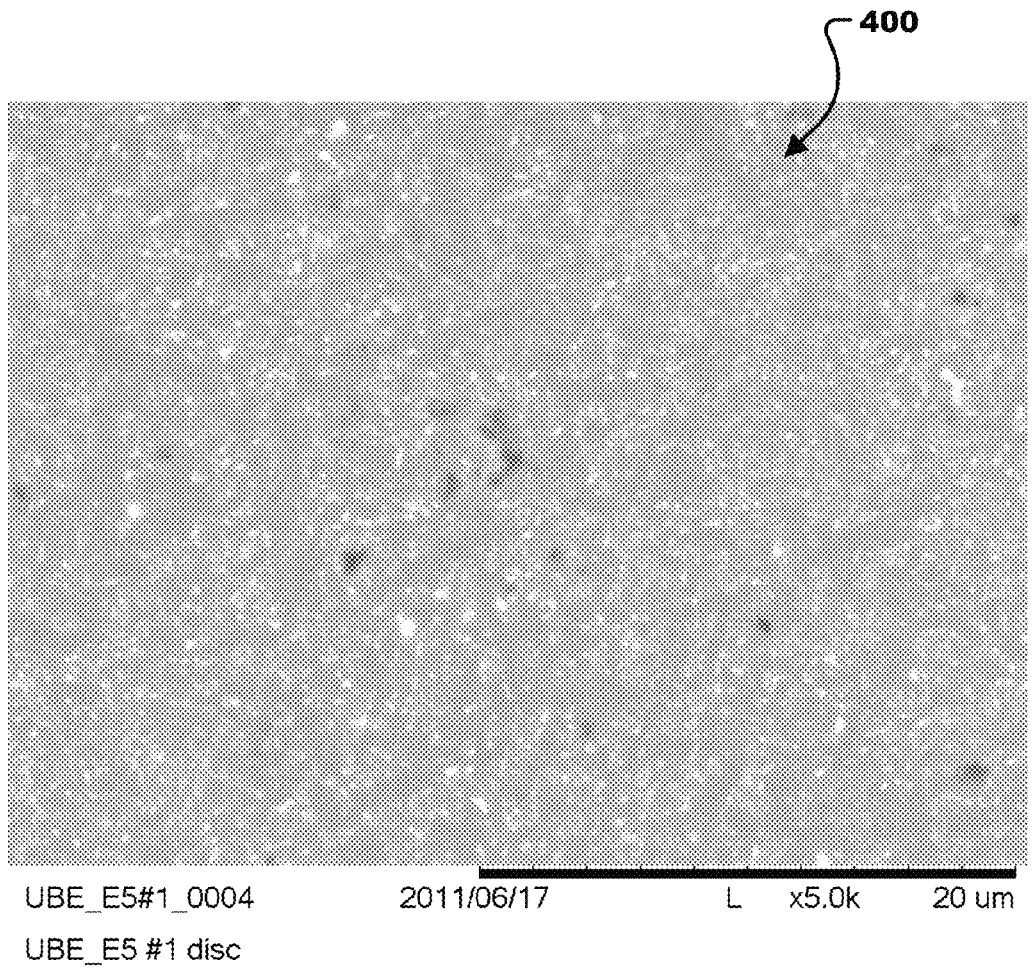
FIG. 4 includes a third SEM image of a portion of a silicon nitride abrasive particle in accordance with an embodiment.
Figure 5:
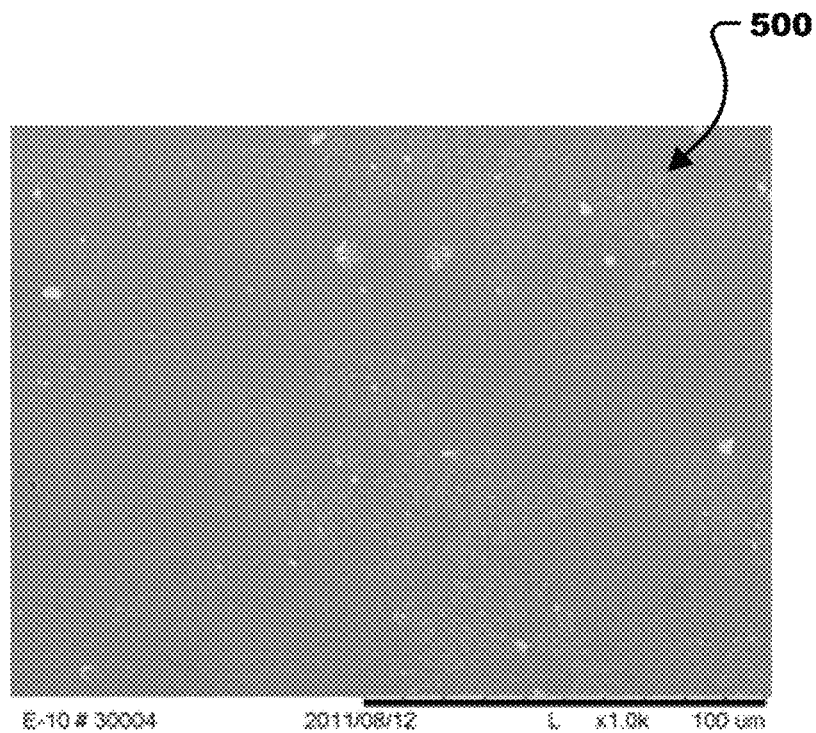
FIG. 5 includes an SEM image of a portion of a silicon nitride abrasive particle in accordance with an embodiment.

FIG. 2 through FIG. 5 include illustrations of various SEM images of a portion of an abrasive particle 200, an abrasive particle 300, an abrasive particle 400, and an abrasive particle 500, respectively. In particular, the abrasive particle 200 of FIG. 2 is formed according to embodiments described herein from a silicon nitride powder having a specific surface area within a range of about 8 $m^2/g$ to about 12 $m^2/g$. The silicon nitride powder was subject to pressureless sintering and hot isostatic pressing. The abrasive particle 200 has a theoretical density of at least about 98%. In addition, the abrasive particle 300 of FIG. 3 is formed according to embodiments described herein. In particular, the abrasive particle 300 was formed from a silicon nitride powder having a specific surface area within a range of about 8 $m^2/g$ to about 12 $m^2/g$. The silicon nitride powder was subject to pressureless sintering and did not undergo a hot isostatic pressing process. Further, the abrasive particle 400 of FIG. 4 is formed according to embodiments described herein using a silicon nitride powder having a specific surface area within a range of about 4 $m^2/g$ to about 6 $m^2/g$. The silicon nitride powder was subject to pressureless sintering and did not undergo a hot isostatic pressing process.

The abrasive particles 200, 300, 400 can include a plurality of elongated, or acicular, grains dispersed within a bond material. FIG. 2 through FIG. 5 indicate that the elongated grains can have an average particle size of at least about 0.1 microns, at least about 0.2 micron, at least about 0.5 microns, or at least about 0.8 microns. Further, the elongated grains can have an average particle size of not greater than about 1.5 microns, not greater than about 1.2 microns, not greater than about 1.1 microns, or even not greater than about 1 microns. It will be appreciated that the average particle size can be within a range between, or including, any of the minimum and maximum sizes noted above.

Further, as depicted in FIG. 2 through FIG. 5, the elongated grains can have an aspect ratio of length:width of at least about 2:1, at least about 5:1, or at least about 10:1. Further, the aspect ratio may be no greater than about 65:1, no greater than about 20:1, no greater than about 15:1, or no greater than about 12:1. It will be appreciated that the aspect ratio can be within a range between, or including, any of the minimum and maximum ratios noted above.

Figure 6:
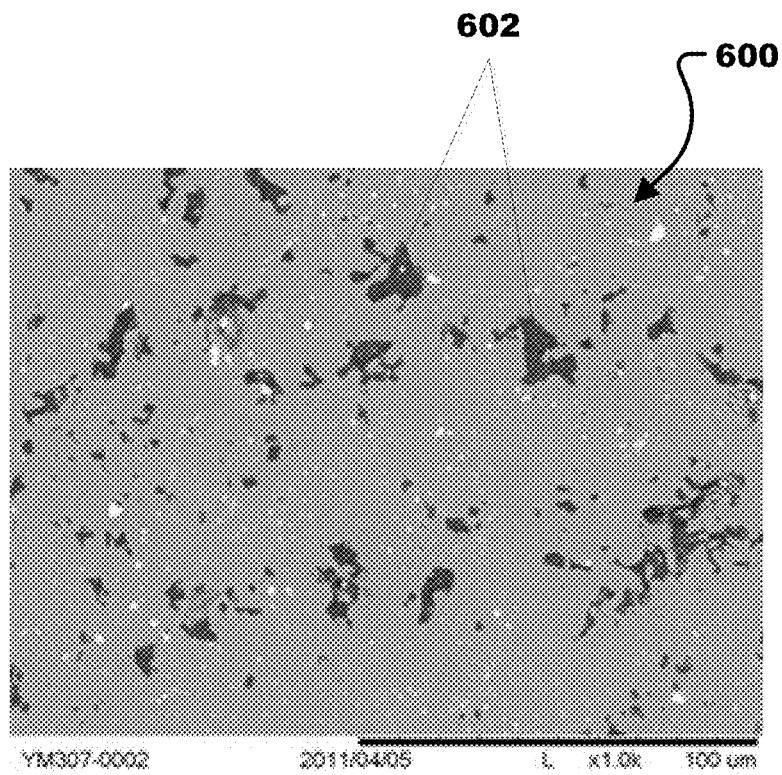
FIG. 6 includes an SEM image of a portion of a conventional silicon nitride abrasive particle.

FIG. 6 includes an SEM image of a portion of a conventional silicon nitride abrasive particle 600. The silicon nitride abrasive particle 600 includes a number of voids, such as voids 602.

In some embodiments, the abrasive particles can be formed to have a specific shape or contour. Suitable forming techniques can include extrusion, molding, screen printing, casting, punching, embossing, pressing, cutting, and a combination thereof. For example, the abrasive particles can have a specific contour, such as a polyhedral shape, including for example, triangular, rectangular, pentagonal, hexagonal, conical, helical, elliptical, and elongated shapes. The abrasive particles may include a combination of such shapes. In one particular embodiment, the abrasive particles can be formed of a body having a complex three-dimensional geometry including 3-fold symmetry in three perpendicular planes defined by a longitudinal axis, a lateral axis, and a vertical axis.

Figure 7:
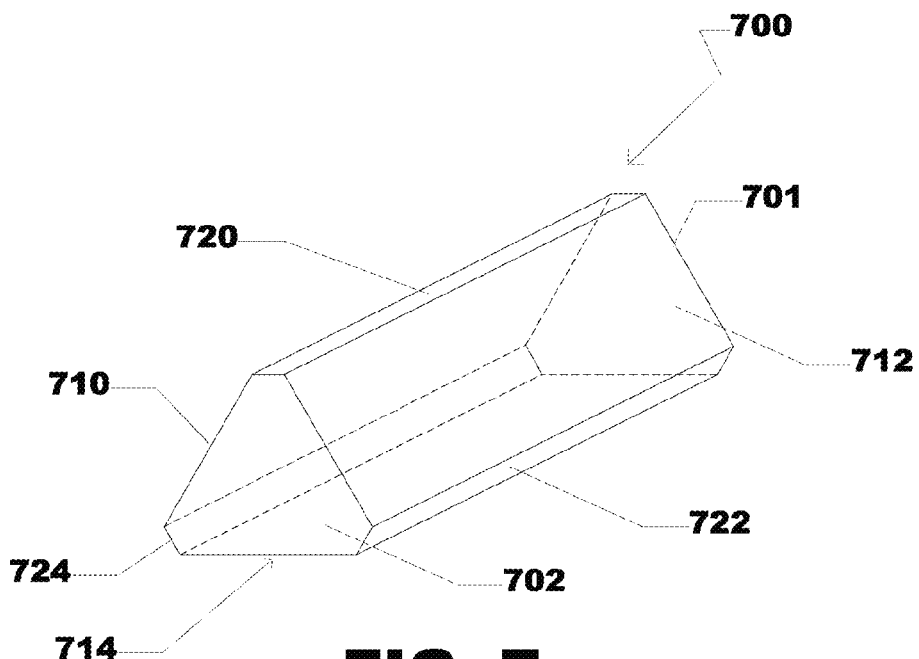
FIGS. 7-12 include illustrations of shaped abrasive particles including the abrasive particulate material according to an embodiment.

FIGS. 7-12 include exemplary abrasive particulate material having specific contours and defining shaped abrasive particles, which can incorporate the compositions described herein. As shown in FIG. 7, the shaped abrasive particle 700 may include a body 701 that is generally prismatic with a first end face 702 and a second end face 704. Further, the shaped abrasive particle 700 may include a first side face 710 extending between the first end face 702 and the second end face 704. A second side face 712 may extend between the first end face 702 and the second end face 704 adjacent to the first side face 710. As shown, the shaped abrasive particle 700 may also include a third side face 714 extending between the first end face 702 and the second end face 704 adjacent to the second side face 712 and the first side face 710.

As depicted in FIG. 7, the shaped abrasive particle 700 may also include a first edge 720 between the first side face 710 and the second side face 712. The shaped abrasive particle 700 may also include a second edge 722 between the second side face 712 and the third side face 714. Further, the shaped abrasive particle 700 may include a third edge 724 between the third side face 714 and the first side face 712.

As shown, each end face 702, 704 of the shaped abrasive particle 700 may be generally triangular in shape. Each side face 710, 712, 714 may be generally rectangular in shape. Further, the cross section of the shaped abrasive particle 700 in a plane parallel to the end faces 702, 704 can be generally triangular. It will be appreciated that while the cross-sectional shape of the shaped abrasive particle 700 through a plane parallel to the end faces 702, 704 is illustrated as being generally triangular, other shapes are possible, including any polygonal shapes, for example a quadrilateral, a pentagon, a hexagon, a heptagon, an octagon, a nonagon, a decagon, etc. Further, the cross-sectional shape of the shaped abrasive particle may be convex, non-convex, concave, or non-concave.

Figure 8:
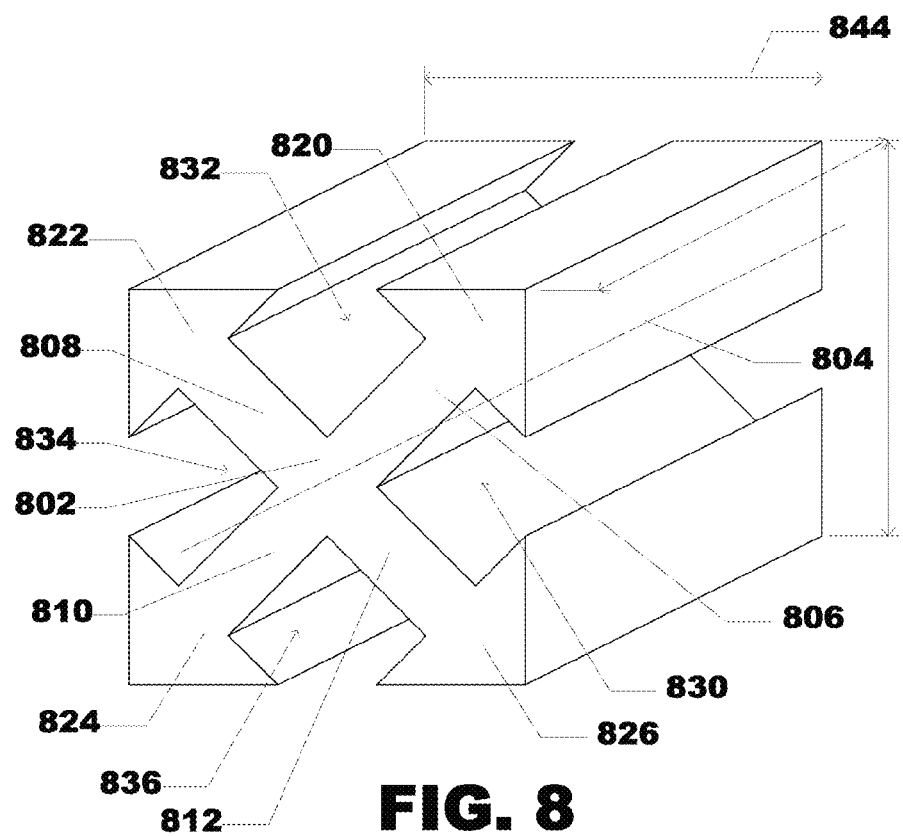

FIG. 8 includes an illustration of a shaped abrasive particle according to another embodiment. As depicted, the shaped abrasive particle 800 may include a body 801 that may include a central portion 802 that extends along a longitudinal axis 804. A first radial arm 806 may extend outwardly from the central portion 802 along the length of the central portion 802. A second radial arm 808 may extend outwardly from the central portion 802 along the length of the central portion 802. A third radial arm 810 may extend outwardly from the central portion 802 along the length of the central portion 802. Moreover, a fourth radial arm 812 may extend outwardly from the central portion 802 along the length of the central portion 802. The radial arms 806, 808, 810, 812 may be equally spaced around the central portion 802 of the shaped abrasive particle 800.

As shown in FIG. 8, the first radial arm 806 may include a generally arrow shaped distal end 820. The second radial arm 808 may include a generally arrow shaped distal end 822. The third radial arm 810 may include a generally arrow shaped distal end 824. Further, the fourth radial arm 812 may include a generally arrow shaped distal end 826.

FIG. 8 also indicates that the shaped abrasive particle 800 may be formed with a first void 830 between the first radial arm 806 and the second radial arm 808. A second void 832 may be formed between the second radial arm 808 and the third radial arm 810. A third void 834 may also be formed between the third radial arm 810 and the fourth radial arm 812. Additionally, a fourth void 836 may be formed between the fourth radial arm 812 and the first radial arm 806.

As shown in FIG. 8, the shaped abrasive particle 800 may include a length 840, a height 842, and a width 844. In a particular aspect, the length 840 is greater than the height 842 and the height 842 is greater than the width 844. In a particular aspect, the shaped abrasive particle 800 may define a primary aspect ratio that is the ratio of the length 840 to the height 842 (length:width). Further, the shaped abrasive particle 800 may define a secondary aspect ratio that is the ratio of the height 842 to the width 844 (width:height). Finally, the shaped abrasive particle 800 may define a tertiary aspect ratio that is the ratio of the length 840 to the width 842 (length:height).

According to one embodiment, the shaped abrasive particles can have a primary aspect ratio of at least about 1:1, such as at least about 1.1:1, at least about 1.5:1, at least about 2:1, at least about 2.5:1, at least about 3:1, at least about 3.5:1, at least 4:1, at least about 4.5:1, at least about 5:1, at least about 6:1, at least about 7:1, at least about 8:1, or even at least about 10:1.

In another instance, the shaped abrasive particle can be formed such that the body has a secondary aspect ratio of at least about 0.5:1, such as at least about 0.8:1, at least about 1:1, at least about 1.5:1, at least about 2:1, at least about 2.5:1, at least about 3:1, at least about 3.5:1, at least 4:1, at least about 4.5:1, at least about 5:1, at least about 6:1, at least about 7:1, at least about 8:1, or even at least about 10:1.

Furthermore, certain shaped abrasive particles can have a tertiary aspect ratio of at least about 1:1, such as at least about 1.5:1, at least about 2:1, at least about 2.5:1, at least about 3:1, at least about 3.5:1, at least 4:1, at least about 4.5:1, at least about 5:1, at least about 6:1, at least about 7:1, at least about 8:1, or even at least about 10:1.

Certain embodiments of the shaped abrasive particle 800 can have a shape with respect to the primary aspect ratio that is generally rectangular, e.g., flat or curved. The shape of the shaped abrasive particle 800 with respect to the secondary aspect ratio may be any polyhedral shape, e.g., a triangle, a square, a rectangle, a pentagon, etc. The shape of the shaped abrasive particle 800 with respect to the secondary aspect ratio may also be the shape of any alphanumeric character, e.g., 1, 2, 3, etc., A, B, C. etc. Further, the contour of the shaped abrasive particle 800 with respect to the secondary aspect ratio may be a character selected from the Greek alphabet, the modern Latin alphabet, the ancient Latin alphabet, the Russian alphabet, any other alphabet, or any combination thereof. Further, the shape of the shaped abrasive particle 800 with respect to the secondary aspect ratio may be a Kanji character.

Figure 9:
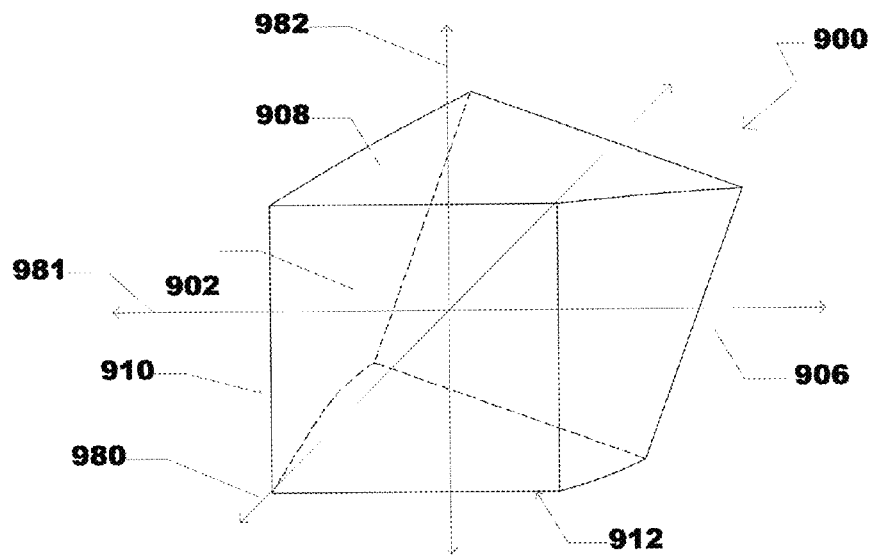
Figure 10:
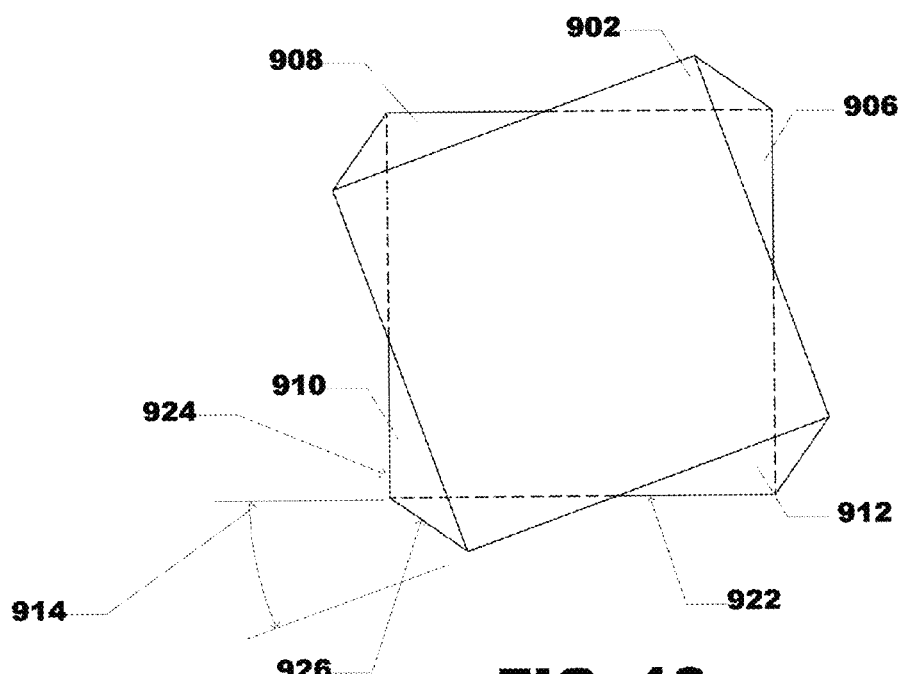

FIGS. 9-10 depict another embodiment of a shaped abrasive particle that is generally designated 900. As shown, the shaped abrasive particle 900 may include a body 901 that has a generally cube-like shape. It will be appreciated that the shaped abrasive particle may be formed to have other polyhedral shapes. The body 901 may have a first end face 902 and a second end face 904, a first lateral face 906 extending between the first end face 902 and the second end face 904, a second lateral face 908 extending between the first end face 902 and the second end face 904. Further, the body 901 can have a third lateral face 910 extending between the first end face 902 and the second end face 904, and a fourth lateral face 912 extending between the first end face 902 and the second end face 904.

As shown, the first end face 902 and the second end face 904 can be parallel to each other and separated by the lateral faces 906, 908, 910, and 912, giving the body a cube-like structure. However, in a particular aspect, the first end face 902 can be rotated with respect to the second end face 904 to establish a twist angle 914. The twist of the body 901 can be along one or more axes and define particular types of twist angles. For example, as illustrated in a top-down view of the body in FIG. 10 looking down the longitudinal axis 980 defining a length of the body 901 on the end face 902 parallel to a plane defined by the lateral axis 981 extending along a dimension of width of the body 901 and the vertical axis 982 extending along a dimension of height of the body 901. According to one embodiment, the body 901 can have a longitudinal twist angle 914 defining a twist in the body 901 about the longitudinal axis such that the end faces 902 and 904 are rotated relative to each other. The twist angle 914, as illustrated in FIG. 10 can be measured as the angle between a tangent of a first edge 922 and a second edge 924, wherein the first edge 922 and second edge 924 are joined by and share a common edge 926 extending longitudinally between two of the lateral faces (910 and 912). It will be appreciated that other shaped abrasive particles can be formed to have twist angles relative to the lateral axis, the vertical axis, and a combination thereof. Any of such twist angles can have a value as described herein.

In a particular aspect, the twist angle 914 is at least about 1°. In other instances, the twist angle can be greater, such as at least about 2°, at least about 5°, at least about 8°, at least about 10°, at least about 12°, at least about 15°, at least about 18°, at least about 20°, at least about 25°, at least about 30°, at least about 40°, at least about 50°, at least about 60°, at least about 70°, at least about 80°, or even at least about 90°. Still, according to certain embodiments, the twist angle 914 can be not greater than about 360°, such as not greater than about 330°, such as not greater than about 300°, not greater than about 270°, not greater than about 230°, not greater than about 200°, or even not greater than about 180°. It will be appreciated that certain shaped abrasive particles can have a twist angle within a range between any of the minimum and maximum angles noted above.

Further, the body may include an opening that extends through the entire interior of the body along one of the longitudinal axis, lateral axis, or vertical axis.

Figure 11:
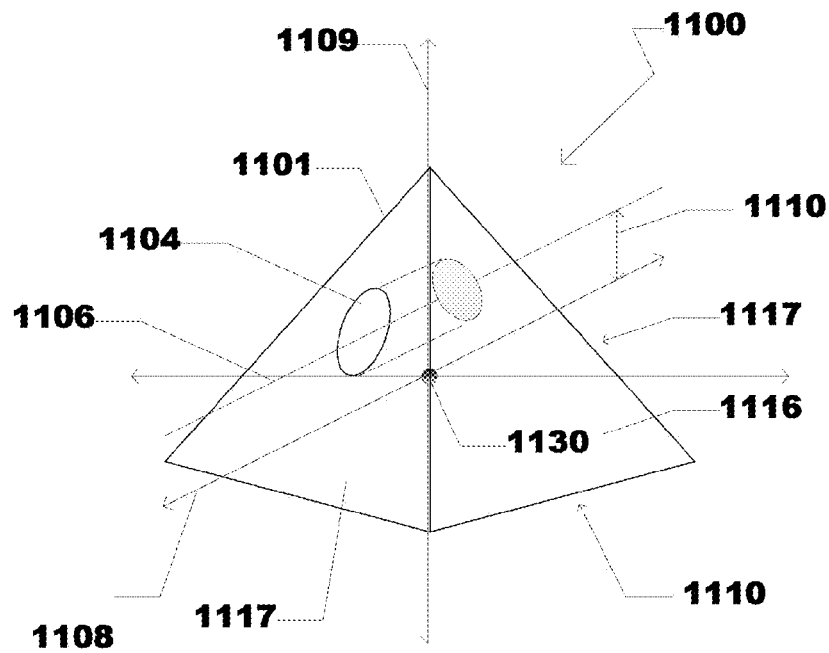

FIG. 11 includes an illustration of another embodiment of a shaped abrasive particle. As shown, the shaped abrasive particle 1100 may include a body 1101 having a generally pyramid shaped with a generally triangle shaped bottom face 1102. The body can further include sides 1116, 1117, and 1118 connected to each other and the bottom face 1102. It will be appreciated that while the body 1101 is illustrated as having a pyramidal polyhedral shape, other shapes are possible, as described herein/

According to one embodiment, the shaped abrasive particle 1100 may be formed with a hole 1104 (i.e., and opening) that can extend through at least a portion of the body 1101, and more particularly may extend through an entire volume of the body 1101. In a particular aspect, the hole 1104 may define a central axis 1106 that passes through a center of the hole 1104. Further, the shaped abrasive particle 1100 may also define a central axis 1108 that passes through a center 1130 of the shaped abrasive particle 1100.

It may be appreciated that the hole 1104 may be formed in the shaped abrasive particle 1100 such that the central axis 1106 of the hole 1104 is spaced apart from the central axis 1108 by a distance 1110. As such, a center of mass of the shaped abrasive particle 1100 may be moved below the geometric midpoint 1130 of the shaped abrasive particle 1100, wherein the geometric midpoint 1130 can be defined by the intersection of a longitudinal axis 1109, vertical axis 1111, and the central axis (i.e., lateral axis) 1108. Moving the center of mass below the geometric midpoint 1130 of the shaped abrasive grain can increase the likelihood that the shaped abrasive particle 1100 lands on the same face, e.g., the bottom face 1102, when dropped, or otherwise deposited, onto a backing, such that the shaped abrasive particle 1100 has a predetermined, upright orientation.

In a particular embodiment, the center of mass is displaced from the geometric midpoint 1130 by a distance that can be at least about 0.05 the height (h) along a vertical axis 1110 of the body 1102 defining a height. In another embodiment, the center of mass may be displaced from the geometric midpoint 1130 by a distance of at least about 0.1 (h), such as at least about 0.15 (h), at least about 0.18 (h), at least about 0.2 (h), at least about 0.22 (h), at least about 0.25 (h), at least about 0.27 (h), at least about 0.3 (h), at least about 0.32 (h), at least about 0.35 (h), or even at least about 0.38 (h). Still, the center of mass of the body 1101 may be displaced a distance from the geometric midpoint 830 of no greater than 0.5 (h), such as no greater than 0.49 (h), no greater than 0.48 (h), no greater than 0.45 (h), no greater than 0.43 (h), no greater than 0.40 (h), no greater than 0.39 (h), or even no greater than 0.38 (h). It will be appreciated that the displacement between the center of mass and the geometric midpoint can be within a range between any of the minimum and maximum values noted above.

In particular instances, the center of mass may be displaced from the geometric midpoint 1130 such that the center of mass is closer to a base, e.g., the bottom face 1102, of the body 1101, than a top of the body 1101 when the shaped abrasive particle 1100 is in an upright orientation as shown in FIG. 11.

In another embodiment, the center of mass may be displaced from the geometric midpoint 1130 by a distance that is at least about 0.05 the width (w) along a lateral axis 1108 of the of the body 1101 defining the width. In another aspect, the center of mass may be displaced from the geometric midpoint 1130 by a distance of at least about 0.1 (w), such as at least about 0.15 (w), at least about 0.18 (w), at least about 0.2 (w), at least about 0.22 (w), at least about 0.25 (w), at least about 0.27 (w), at least about 0.3 (w), or even at least about 0.35 (w). Still, in one embodiment, the center of mass may be displaced a distance from the geometric midpoint 1130 no greater than 0.5 (w), such as no greater than 0.49 (w), no greater than 0.45 (w), no greater than 0.43 (w), no greater than 0.40 (w), or even no greater than 0.38 (w).

In another embodiment, the center of mass may be displaced from the geometric midpoint 1130 along the longitudinal axis 1109 by a distance ($D_1$) of at least about 0.05 the length (l) of the body 1101. According to a particular embodiment, the center of mass may be displaced from the geometric midpoint by a distance of at least about 0.1 (l), such as at least about 0.15 (l), at least about 0.18 (l), at least about 0.2 (l), at least about 0.25 (l), at least about 0.3 (l), at least about 0.35 (l), or even at least about 0.38 (l). Still, for certain abrasive particles, the center of mass can be displaced a distance no greater than about 0.5 (l), such as no greater than about 0.45 (l), or even no greater than about 0.40 (l).

Figure 12:
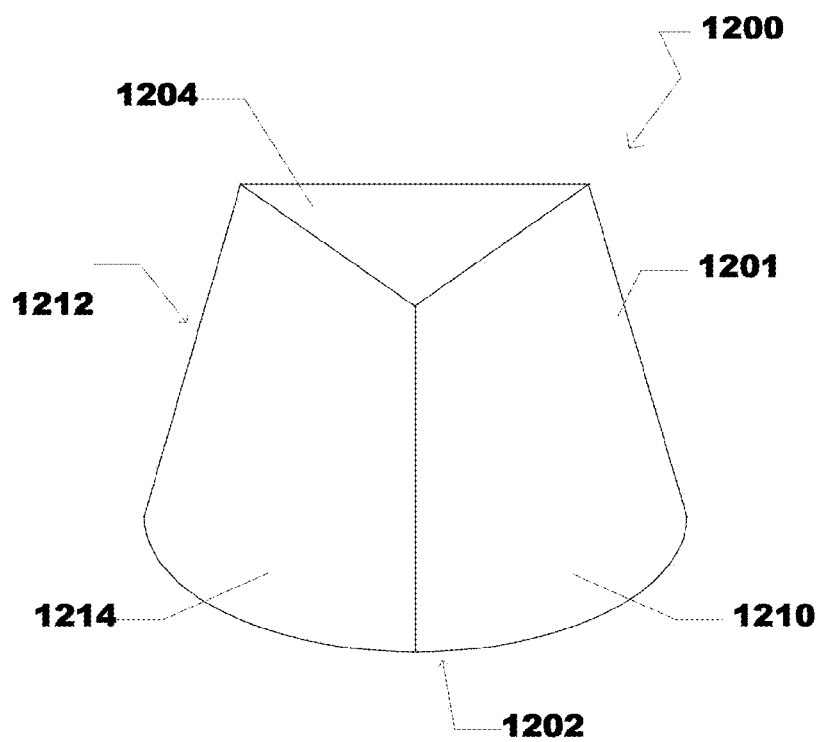

FIG. 12 includes an illustration of a shaped abrasive particle according to an embodiment. The shaped abrasive grain 1200 may include a body 1201 including a base surface 1202 and an upper surface 1204 separated from each other by one or more side surfaces 1210, 1212, and 1214. According to one particular embodiment, the body 1201 can be formed such that the base surface 1202 has a planar shape different than a planar shape of the upper surface 1204, wherein the planar shape is viewed in the plane defined by the respective surface. For example, as illustrated in the embodiment of FIG. 12, the body 1201 can have base surface 1202 generally have a circular shape and an upper surface 1204 having a generally triangular shape. It will be appreciated that other variations are feasible, including any combination of shapes at the base surface 1202 and upper surface 1204.

Additionally, the body of the shaped abrasive particles can have particular two-dimensional shapes. For example, the body can have a two-dimensional shape as viewed in a plane defined by the length and width having a polygonal shape, ellipsoidal shape, a numeral, a Greek alphabet character, Latin alphabet character, Russian alphabet character, complex shapes utilizing a combination of polygonal shapes and a combination thereof. Particular polygonal shapes include triangular, rectangular, quadrilateral, pentagon, hexagon, heptagon, octagon, nonagon, decagon, any combination thereof.

Figure 13:
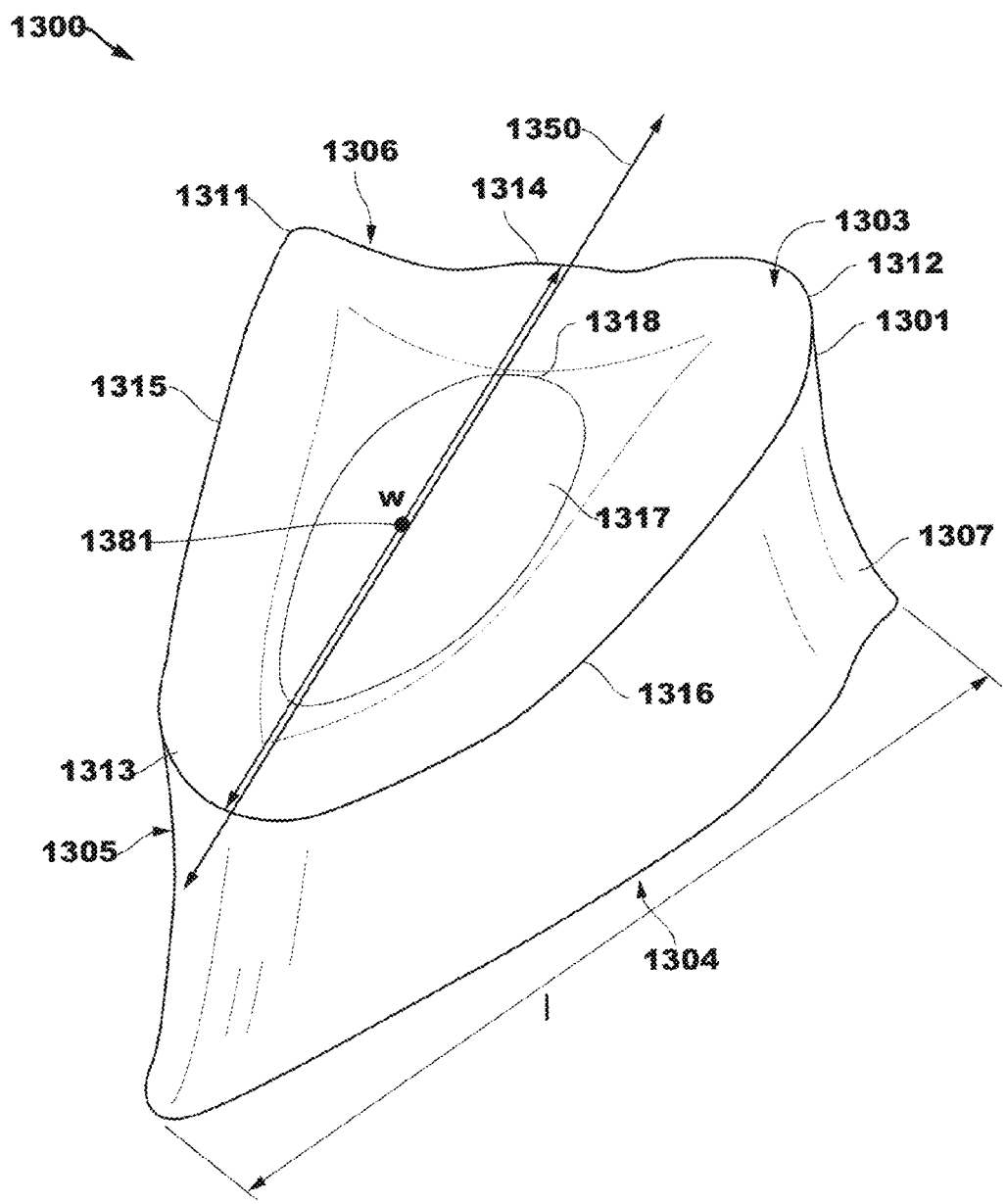
FIG. 13 includes a perspective view illustration of an abrasive particle in accordance with an embodiment.

FIG. 13 includes a perspective view illustration of an abrasive particle in accordance with an embodiment. Additionally, FIG. 14 includes a cross-sectional illustration of a portion of the abrasive particle of FIG. 13. The body 1301 includes an upper surface 1303 a bottom major surface 1304 opposite the upper surface 1303. The upper surface 1303 and the bottom surface 1304 can be separated from each other by side surfaces 1305, 1306, and 1307. As illustrated, the body 1301 of the shaped abrasive particle 1300 can have a generally triangular shape as viewed in a plane of the upper surface 1303 defined by the length (l) and width (w) of the body 1301. In particular, the body 1301 can have a length (l), a width (w) extending through a midpoint 1381 of the body 1301.

In accordance with an embodiment, the body 1301 of the shaped abrasive particle can have a first height (h1) at a first end of the body defined by a corner 1313. Notably, the corner 1313 may represent the point of greatest height on the body 1301. The corner can be defined as a point or region on the body 1301 defined by the joining of the upper surface 1303, and two side surfaces 1305 and 1307. The body 1301 may further include other corners, spaced apart from each other, including for example corner 1311 and corner 1312. As further illustrated, the body 1301 can include edges 1314, 1315, and 1316 that can separated from each other by the corners 1311, 1312, and 1313. The edge 1314 can be defined by an intersection of the upper surface 1303 with the side surface 1306. The edge 1315 can be defined by an intersection of the upper surface 1303 and side surface 1305 between corners 1311 and 1313. The edge 1316 can be defined by an intersection of the upper surface 1303 and side surface 1307 between corners 1312 and 1313.

Figure 14:
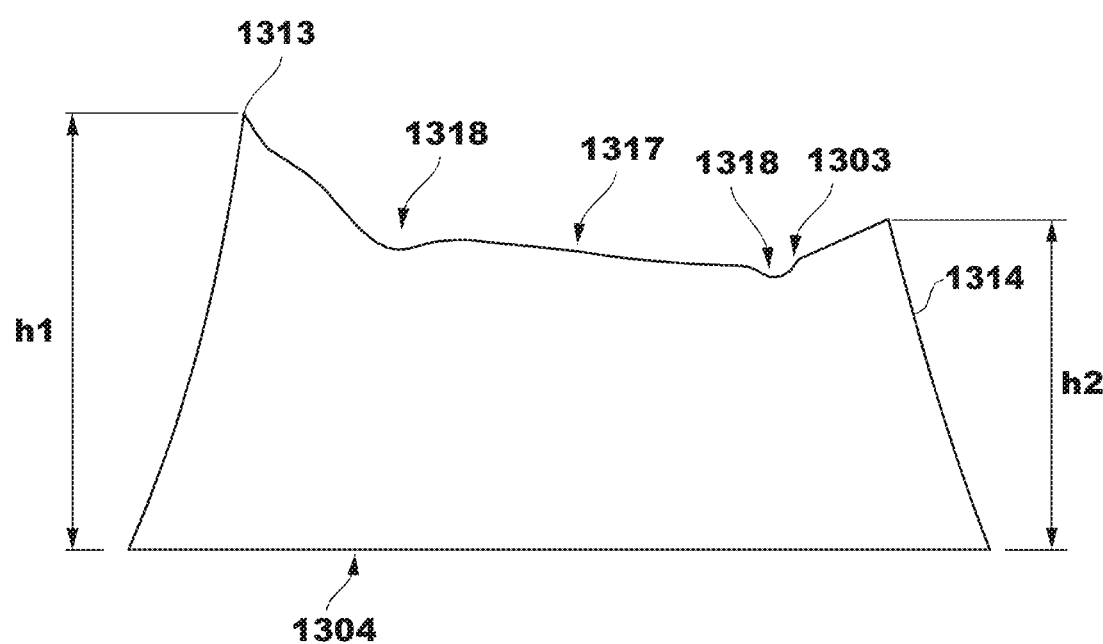
FIG. 14 includes a cross-sectional illustration of a portion of the abrasive particle of FIG. 13.

As further illustrated, the body 1301 can include a second height (h2) at a second end of the body 1301, which is defined by the edge 1314, and further which is opposite the first end defined by the corner 1313. The axis 1350 can extend between the two ends of the body 1301. FIG. 14 is a cross-sectional illustration of the body 1301 along the axis 1350, which can extend through a midpoint 1381 of the body along the dimension of width (w) between the ends of the body 1301.

In accordance with an embodiment, the shaped abrasive particles of the embodiments herein, including for example, the abrasive particle of FIGS. 13 and 14 can have an average difference in height, which is a measure of the difference between h1 and h2. More particularly, the average difference in height can be calculated based upon a plurality of shaped abrasive particles from a sample. The sample can include a representative number of shaped abrasive particles, which may be randomly selected from a batch, such as at least 8 particles, or even at least 10 particles. A batch can be a group of shaped abrasive particles that are produced in a single forming process, and more particularly, in the same, single forming process. The average difference can be measured via using a STIL (Sciences et Techniques Industrielles de la Lumiere—France) Micro Measure 3D Surface Profilometer (white light (LED) chromatic aberration technique).

In particular instances, the average difference in height [h1-h2], wherein h1 is greater, can be at least about 50 microns. In still other instances, the average difference in height can be at least about 60 microns, such as at least about 65 microns, at least about 70 microns, at least about 75 microns, at least about 80 microns, at least about 90 microns, or even at least about 100 microns. In one non-limiting embodiment, the average difference in height can be not greater than about 300 microns, such as not greater than about 250 microns, not greater than about 220 microns, or even not greater than about 180 microns. It will be appreciated that the average difference in height can be within a range between any of the minimum and maximum values noted above.

Moreover, the shaped abrasive particles herein, including for example the particle of FIGS. 13 and 14, can have a profile ratio of average difference in height [h1-h2] to profile length ($l_p$) of the shaped abrasive particle, defined as [(h1-h2)/($l_p$)] of at least about 0.04. It will be appreciated that the profile length of the body can be a length of the scan across the body used to generate the data of h1 and h2 between opposite ends of the body. Moreover, the profile length may be an average profile length calculated from a sample of multiple particles that are measured. In certain instances, the profile length ($l_p$) can be the same as the width as described in embodiments herein. According to a particular embodiment, the profile ratio can be at least about 0.05, at least about 0.06, at least about 0.07, at least about 0.08, or even at least about 0.09. Still, in one non-limiting embodiment, the profile ratio can be not greater than about 0.3, such as not greater than about 0.2, not greater than about 0.18, not greater than about 0.16, or even not greater than about 0.14. It will be appreciated that the profile ratio can be within a range between any of the minimum and maximum values noted above.

Moreover, the shaped abrasive particles of the embodiments herein, including for example, the body 1301 of the particle of FIGS. 13 and 14 can have a bottom surface 1304 defining a bottom area ($A_b$). In particular instances the bottom surface 1304 can be the largest surface of the body 1301. The bottom surface can have a surface area defined as the bottom area ($A_b$) that is greater than the surface area of the upper surface 1303. Additionally, the body 1301 can have a cross-sectional midpoint area ($A_m$) defining an area of a plane perpendicular to the bottom area and extending through a midpoint 1381 of the particle. In certain instances, the body 1301 can have an area ratio of bottom area to midpoint area ($A_b/A_m$) of not greater than about 6. In more particular instances, the area ratio can be not greater than about 5.5, such as not greater than about 5, not greater than about 4.5, not greater than about 4, not greater than about 3.5, or even not greater than about 3. Still, in one non-limiting embodiment, the area ratio may be at least about 1.1, such as at least about 1.3, or even at least about 1.8. It will be appreciated that the area ratio can be within a range between any of the minimum and maximum values noted above.

In accordance with one embodiment, the shaped abrasive particles of the embodiments herein, including for example, the particle of FIGS. 13 and 14 can have a normalized height difference of at least about 40. The normalized height difference can be defined by the equation $[(h1-h2)/(h1/h2)]$, wherein h1 is greater than h2. In other embodiments, the normalized height difference can be at least about 43, at least about 46, at least about 50, at least about 53, at least about 56, at least about 60, at least about 63, or even at least about 66. Still, in one particular embodiment, the normalized height difference can be not greater than about 200, such as not greater than about 180, not greater than about 140, or even not greater than about 110.

In another embodiment, the shaped abrasive particles herein, including for example, the particle of FIGS. 13 and 14 can have a height variation. Without wishing to be tied to a particular theory, it is thought that a certain height variation between shaped abrasive particles, can improve a variety of cutting surfaces, and may improve grinding performance of an abrasive article incorporating the shaped abrasive particles herein. The height variation can be calculated as the standard deviation of height difference for a sample of shaped abrasive particles. In one particular embodiment, the height variation of a sample can be at least about 20. For other embodiments, the height variation can be greater, such as at least about 22, at least about 24, at least about 26, at least about 28, at least about 30, at least about 32, or even at least about 34. Still, in one non-limiting embodiment, the height variation may be not greater than about 180, such as not greater than about 150, or even not greater than about 120. It will be appreciated that the height variation can be within a range between any of the minimum and maximum values noted above.

According to another embodiment, the shaped abrasive particles herein, including for example the particles of FIGS. 13 and 14 can have an ellipsoidal region 1317 in the upper surface 1303 of the body 1301. The ellipsoidal region 1317 can be defined by a trench region 1318 that can extend around the upper surface 1303 and define the ellipsoidal region 1317. The ellipsoidal region 1317 can encompass the midpoint 1381. Moreover, it is thought that the ellipsoidal region 1317 defined in the upper surface can be an artifact of the forming process, and may be formed as a result of the stresses imposed on the mixture during formation of the shaped abrasive particles according to the methods described herein.

Moreover, the rake angle described in accordance with other embodiments herein can be applicable to the body 1301. Likewise, all other features described herein, such as the contours of side surfaces, upper surfaces, and bottom surfaces, the upright orientation probability, primary aspect ratio, secondary aspect ratio, tertiary aspect ratio, and composition, can be applicable to the exemplary shaped abrasive particle illustrated in FIGS. 13 and 14.

While the foregoing features of height difference, height variation, and normalized height difference have been described in relation to the abrasive particle of FIGS. 13 and 14, it will be appreciated that such features can apply to any other shaped abrasive particles described herein, including for example, abrasive particles having a substantially trapezoidal two-dimensional shape.

The shaped abrasive particles of the embodiments herein may include a dopant material, which can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

In certain instances, the shaped abrasive particles can be formed to have a specific content of dopant material. For example, the body of a shaped abrasive particle may include not greater than about 12 wt % for the total weight of the body. In other instances, the amount of dopant material can be less, such as not greater than about 11 wt %, not greater than about 10 wt %, not greater than about 9 wt %, not greater than about 8 wt %, not greater than about 7 wt %, not greater than about 6 wt %, or even not greater than about 5 wt % for the total weight of the body. In at least one non-limiting embodiment, the amount of dopant material can be at least about 0.5 wt %, such at least about 1 wt %, at least about 1.3 wt %, at least about 1.8 wt %, at least about 2 wt %, at least about 2.3 wt %, at least about 2.8 wt %, or even at least about 3 wt % for the total weight of the body. It will be appreciated that the amount of dopant material within the body of the shaped abrasive particle can be within a range between any of the minimum or maximum percentages noted above.

Figure 15:
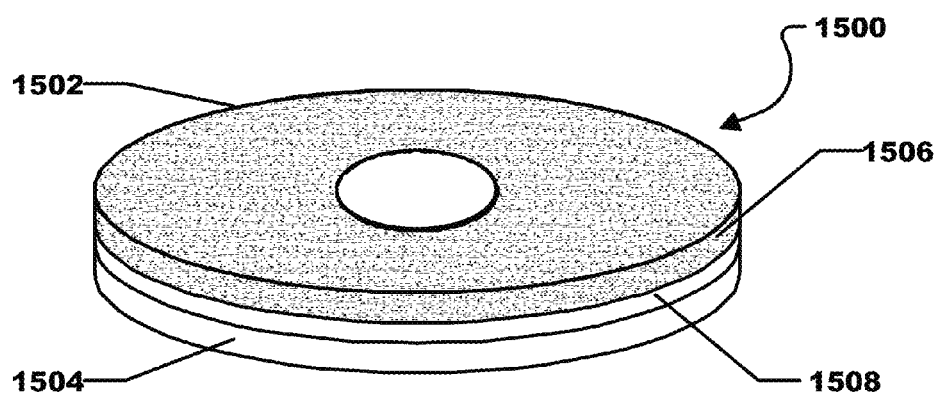
FIG. 15 includes a perspective view of a bonded abrasive wheel incorporating silicon nitride abrasive particles according to an embodiment.

Referring to FIG. 15, a bonded abrasive wheel is shown and is generally designated 1500. As shown, the bonded abrasive wheel 1500 can include a generally cylindrical bonded abrasive body 5102. It can be appreciated that the bonded abrasive wheel 1500 may include any geometric shape. The bonded abrasive body 1502 can include a single-layered abrasive tool that includes a substrate 1504 and a single layer of abrasive particles 1506 attached to the substrate 1504 with a layer of bond material 1508. The abrasive particles can be silicon nitride abrasive particles according to one or more embodiments described herein.

In a particular embodiment, the layer of bond material 1508 can be disposed between the layer of abrasive particles 1506 and the substrate 1504. Further, a portion of the abrasive particles 1506 can contact the substrate 1504 through the layer of the bond material 1508. In another aspect, a minority portion of the abrasive particles 1506 can be covered by the bond material 1508.

Additionally, a portion of the abrasive particles 1506 can protrude from the bond material 1508 and can contact the substrate 1504 that is underlying the bond material 1508. In particular, a majority portion of the abrasive particles 1506 can protrude from the bond material 1508 and can contact the substrate 1504 that is underlying the bond material 1508.

In an embodiment, the bond material 1508 can include an organic material. In particular, the bond material can include a resin. Further, the bond material 1508 can include a phenolic resin. The bond material 1508 can consist essentially of a phenolic resin.

In another embodiment, the bond material 1508 can include an inorganic material. For example, the bond material 1508 can include a material that can be selected from the group consisting of a metal, metal alloy, oxide, and a combination thereof. The bond material 1508 may also include a vitreous phase material. Specifically, the bond material 1508 can include an oxide, and the oxide can include an element selected from the group consisting of Si, Al, Na, Mg, Ca, K, B, P, and a combination thereof. In another aspect, the bond material 1508 can include a hybrid bond that can include an organic material and an inorganic material.

In another aspect, the abrasive particles 1506 can include a majority content of silicon nitride and a minority content of sintering material including $Nd_2O_3$ and $Y_2O_3$, where the abrasive particles 1506 comprise a content (wt %) of $Nd_2O_3$ greater than a content of $Y_2O_3$ (wt %). Moreover, the abrasive particles 1506 can comprise a total content of rare earth oxide greater than a content of alumina. The abrasive particles 1506 can include a content (wt %) of alumina that is less than a content (wt %) of a rare earth oxide composition. The abrasive particles 1506 can include a content (wt %) of alumina that is less than a content (wt %) of $Y_2O_3$. Further, the abrasive particles 1506 can include a content (wt %) of alumina that is less than a content (wt %) of $Nd_2O_3$.

Specifically, the abrasive particles 1506 can include a content of alumina (wt %) that is between about 0.3 and about 0.7 of a content (wt %) of a rare earth oxide composition. The abrasive particles 1506 can include a content of alumina (wt %) that is between about 0.3 and about 0.7 of a content (wt %) of $Nd_2O_3$. In another aspect, the abrasive particles 1506 can be essentially free of materials selected from the group consisting of $La_2O_3$, $MgO$, $ZrO_2$, $HfO_2$, $SiO_2$, $Fe_2O_3$, $Gd_2O_3$, $Lu_2O_3$, Fe, W, Mo, Cu, and elemental Si.

In another embodiment, the abrasive particles 1506 can include no greater than about 13 wt % of a rare earth oxide, no greater than about 10 wt % of a rare earth oxide, no greater than about 8.5 wt % of a rare earth oxide, or even no greater than about 8.2 wt % of a rare earth oxide for the total weight of the abrasive particles. The abrasive particles 506 can include at least about 2 wt % of a rare earth oxide, at least about 5 wt % of a rare earth oxide, at least about 6.5 wt % of a rare earth oxide, or at least about 7.8 wt % of a rare earth oxide for the total weight of the abrasive particles. It will be appreciated that the amount of rare earth oxide of each abrasive particle can be within a range between, or including, any of the minimum and maximum percentages noted above.

The abrasive particles 1506 can include no greater than about 5 wt % $Y_2O_3$, no greater than about 4.5 wt % $Y_2O_3$, no greater than about 4 wt % $Y_2O_3$, no greater than about 3.5 wt % $Y_2O_3$, or no greater than about 3.2 wt % $Y_2O_3$ for the total weight of the abrasive particles. Also, the abrasive particles 506 can include at least about 1 wt % $Y_2O_3$, at least about 1.5 wt % $Y_2O_3$, at least about 2 wt % Y2O3, or at least about 2.8 wt % $Y_2O_3$ for the total weight of the abrasive particles. It will be appreciated that the amount of $Y_2O_3$ of each abrasive particle can be within a range between, or including, any of the minimum and maximum percentages noted above.

In another aspect, the abrasive particles 1506 can include no greater than about 7 wt % $Nd_2O_3$, no greater than about 6.5 wt % $Nd_2O_3$, no greater than about 6 wt % $Nd_2O_3$, no greater than about 5.5 wt % $Nd_2O_3$, or even no greater than about 5.1 wt % $Nd_2O_3$ for the total weight of the abrasive particles. Moreover, the abrasive particles 506 can include at least about 3 wt % $Nd_2O_3$, at least about 3.5 wt % $Nd_2O_3$, at least about 4 wt % Nd2O3, or at least about 4.8 wt % $Nd_2O_3$ for the total weight of the abrasive particles. It will be appreciated that the amount of $Nd_2O_3$ of each abrasive particle can be within a range between, or including, any of the minimum and maximum percentages noted above.

In still another aspect, the abrasive particles 1506 can include AlN. Specifically, the abrasive particles 1506 can include no greater than about 3 wt % AlN, no greater than about 2.5 wt % AlN, no greater than about 2 wt % AlN, no greater than about 1.5 wt % AlN, or even no greater than about 1 wt % AlN for the total weight of the abrasive particles. Moreover, the abrasive particles 506 can include at least about 0.05 wt % AlN, at least about 0.1 wt % AlN, at least about 0.3 wt % AlN, or at least about 0.5 wt % AlN for the total weight of the abrasive particles. It will be appreciated that the amount of AlN of each abrasive particle can be within a range between, or including, any of the minimum and maximum percentages noted above.

In another embodiment, the abrasive particles 1506 can include Ti. Further, the abrasive particles 1506 can include TiC. The abrasive particles 506 can include no greater than about 3 wt % TiC, no greater than about 2.5 wt % TiC, no greater than about 2 wt % TiC, no greater than about 1.5 wt % TiC, or even no greater than about 1 wt % TiC for the total weight of the abrasive particles. Also, the abrasive particles 506 can include at least about 0.05 wt % TiC, at least about 0.1 wt % AlN, at least about 0.2 wt % TiC, or at least about 0.4 wt % TiC for the total weight of the abrasive particles. It will be appreciated that the amount of TiC of each abrasive particle can be within a range between, or including, any of the minimum and maximum percentages noted above.

In another aspect, the abrasive particles 1506 can consist essentially of silicon nitride and a sintering phase comprising an oxide. Additionally, the abrasive particles 506 can include liquid phase sintered silicon nitride.

In another embodiment, the abrasive particles 1506 can include beta-phase silicon nitride. In particular, the abrasive particles 1506 can include a majority content (>50 wt %) of beta-phase silicon nitride. Further, the abrasive particles 1506 can consist essentially of beta-phase silicon nitride.

It is to be understood that the abrasive particles 1506 can include abrasive grains having an elongated shape. The elongated grains can an aspect ratio of length:width of at least about 1.5:1, at least about 5:1, or at least about 10:1. Further, the aspect ratio may be no greater than about 65:1, no greater than about 45:1, no greater than about 20:1, no greater than about 15:1, or no greater than about 12:1. It will be appreciated that the aspect ratio can be within a range between, or including, any of the minimum and maximum ratios noted above.

Figure 16:
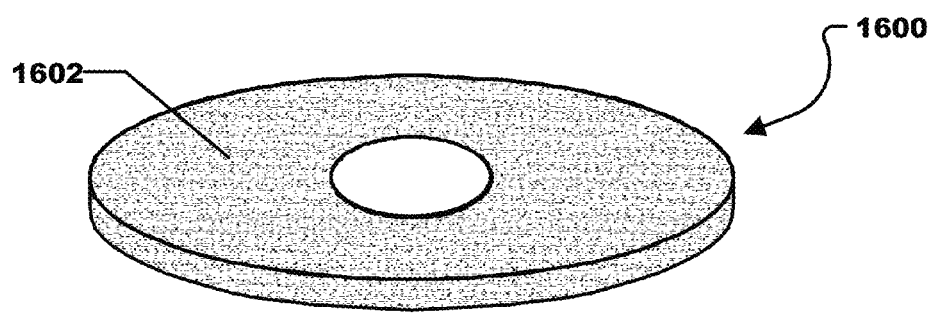
FIG. 16 includes a perspective view of another bonded abrasive wheel incorporating silicon nitride abrasive particles according to an embodiment.

FIG. 16 illustrates another abrasive article 1600. The abrasive article 1600 can include a body 1602. The body 1602 can include a single-layer of abrasive particles contained within a bond material that includes an organic material. In such an embodiment, the abrasive particles can include a majority content of silicon nitride and a minority content of sintering material that can include at least two rare-earth oxide materials. In an embodiment, the abrasive particles contained within the bond material of the body 1602 can have substantially the same composition as the abrasive particles 1506 and the bond material 1508 of the body 1502 shown in FIG. 15.

Figure 17:
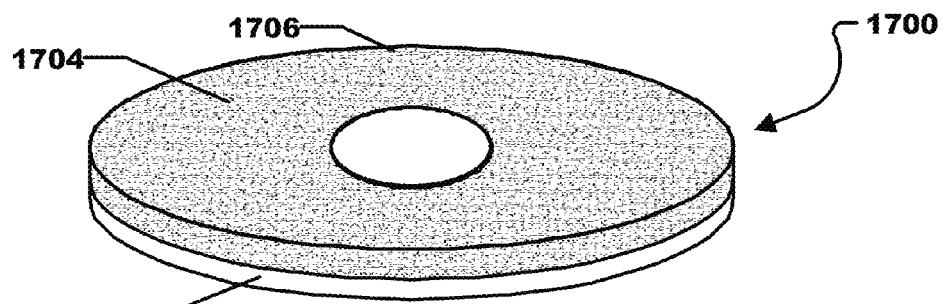
FIG. 17 includes a perspective view of yet another bonded abrasive wheel incorporating silicon nitride abrasive particles according to an embodiment.

FIG. 17 shows yet another abrasive article 1700. As shown in FIG. 17, the abrasive article 1700 can be a single-layered bonded abrasive tool that includes a substrate 1702 and a layer of bond material 1704 that can overlay a surface of the substrate 1702. Abrasive particles 1706 can be adhered within the bond material 1704 and attached to the surface of the substrate 1702. The abrasive particles 1706 can include liquid-phase sintered silicon nitride. In an embodiment, the abrasive particles 1706 contained within the bond material 1704 of the abrasive article 1700 can have substantially the same composition as the abrasive particles 1506 and the bond material 1508 of the body 1502 shown in FIG. 15.

According to embodiments herein, a body can include abrasive particles that include silicon nitride contained within a bond material. The body can have a G-ratio of at least about 250 for a grinding operation conducted at a speed of at least about 50 feet/minute, for a depth of cut of at least about 0.0002 inches [5.08 µm] on a metal workpiece, where the G-ratio is a measure of weight of the material removed from the workpiece relative to the weight of material lost from the body. In some cases, the bond material can include an organic material.

For any of the embodiments described herein, the G-ratio can be at least about 275, at least about 280, at least about 290, or even at least about 300 for a grinding operation conducted at a speed of at least about 60 revolutions/minute and a depth of cut of at least about 0.0002 inches [5.08 µm] on a workpiece of bearing steel.

Further, for any of the embodiments herein, the G-ratio can be at least about 275, at least about 300, at least about 400, at least about 500, at least about 600, at least about 900, or at least about 1000 for a grinding operation conducted at speed of at least about 60 revolutions/minute and a depth of cut of at least about 0.0005 inches [12.7 µm] on a workpiece of titanium alloy.

Additionally, for any of the embodiments herein, the G-ratio can be at least about 125, at least about 140, at least about 160, at least about 170, or at least about 180 for a grinding operation conducted at speed of at least about 60 revolutions/minute and a depth of cut of at least about 0.0005 inches [12.7 µm] on a workpiece of 304 stainless steel.

Moreover, the G-ratio for any embodiments herein can be at least about 110, at least about 115, or at least about 120 for a grinding operation conducted at speed of at least about 60 revolutions/minute and a depth of cut of at least about 0.0015 inches [38.1 µm] on a workpiece of 304 stainless steel.

Further, for any of the embodiments herein, the G-ratio can be at least about 500, at least about 800, at least about 1300, at least about 1700, at least about 2100, at least about 2400, or at least about 2750 for a grinding operation conducted at speed of at least about 60 revolutions/minute and a depth of cut of at least about 0.0015 inches [12.7 µm] on a workpiece of white cast iron.

It can be appreciated that the embodiments herein may be used to grind or polish a workpiece. For example, the workpiece can include a metal that can be selected from the group of metals consisting of iron, steel, titanium, titanium alloys, nickel, nickel alloys, and a combination thereof. The workpiece can consist essentially of steel. Alternatively, the workpiece can consist essentially of white cast iron. Moreover, the workpiece can consist essentially of titanium alloy (6Al-4V Grade 5).

EXAMPLES

Abrasive grains for Example 1 grinding wheels are formed by providing a mixture having the following composition:
  88.02 wt % Silicon nitride powder
  3.07 wt % $Y_2O_3$ powder
  2.55 wt % $Al_2O_3$ powder
  0.9 wt % AlN powder
  4.96 wt % $Nd_2O_3$ powder
  0.5 wt % TiC powder The mixture is milled in an aqueous medium comprising 80% $H_2O$ and 20% IPA to a surface area of approximately 12.5 $m^2/g$ and an average particle size of approximately 0.8 microns. The milled powder is freeze dried and subsequently screened. The screened powder is sintered at 1750° C. for 90 minutes in a nitrogen environment followed by a hot isostatic press treatment at 1800° C. for 2 hours at 30 Ksi. The densified particles are milled and screened into two different grit sizes of 36 and 54 meshes and used to make single layer grinding wheels for grinding evaluation.

The grinding wheels are tested against a wet titanium alloy workpiece and a dry white cast iron workpiece placed on a 2-axis hydraulic surface grinding machine sold by Okamoto Corporation as model 6•18 DX. The table speed of the grinder is 60 feet/minute at an infeed (i.e., cut depth) of approximately 0.0005 inches. The grinding tests are conducted until the abrasive grains are depleted and grinding wheels stopped removing material from the workpiece. A grinding wheel having silicon nitride particles formed according to Example 1 is tested against a grinding wheel having SiC abrasives. The results of the testing are shown in FIG. 18 and FIG. 19.

Figure 18:
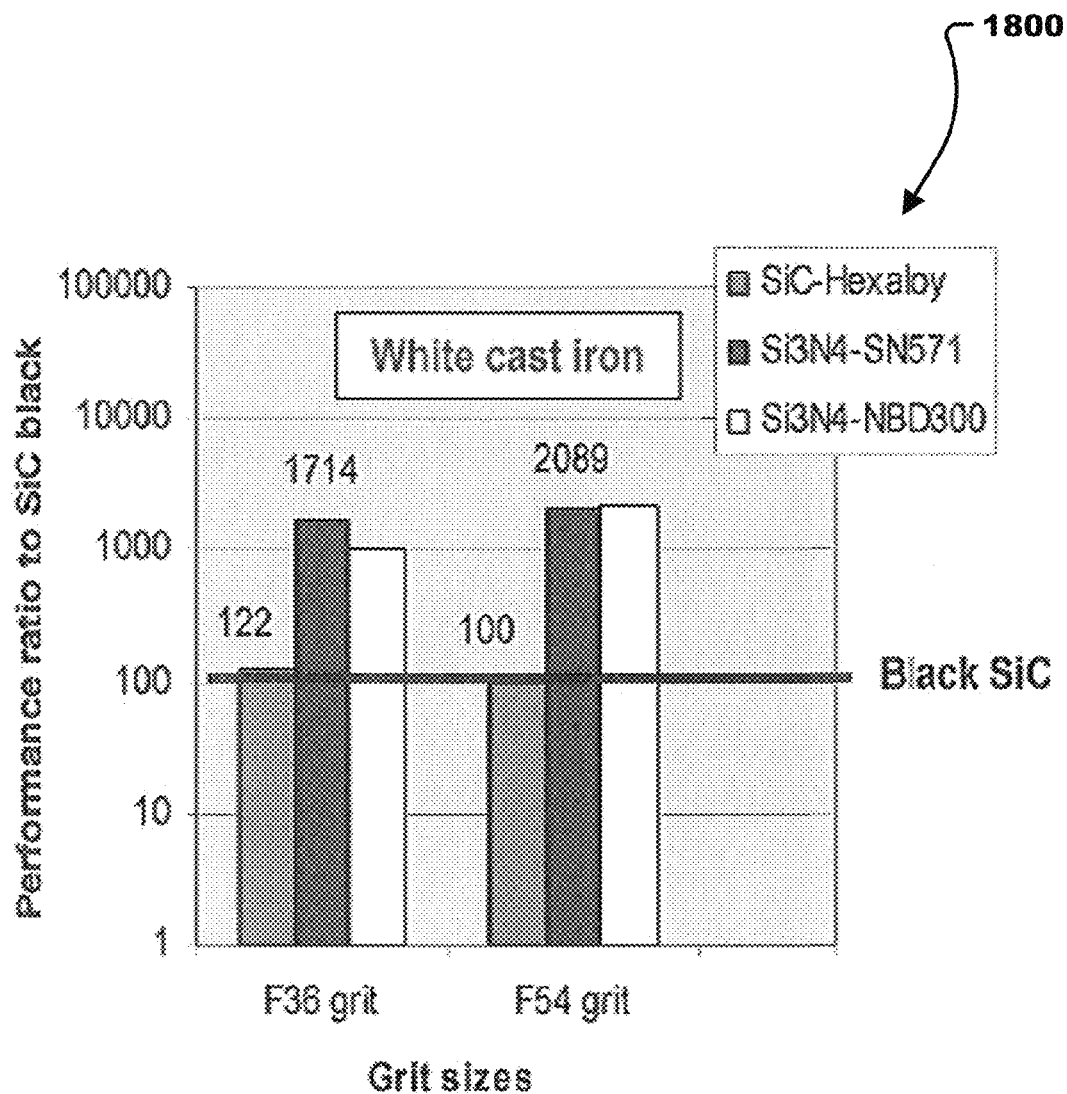
FIG. 18 includes a first bar chart illustrating a G-ratio for various bonded abrasive grinding wheels during grinding of a white cast iron workpiece.
Figure 19:
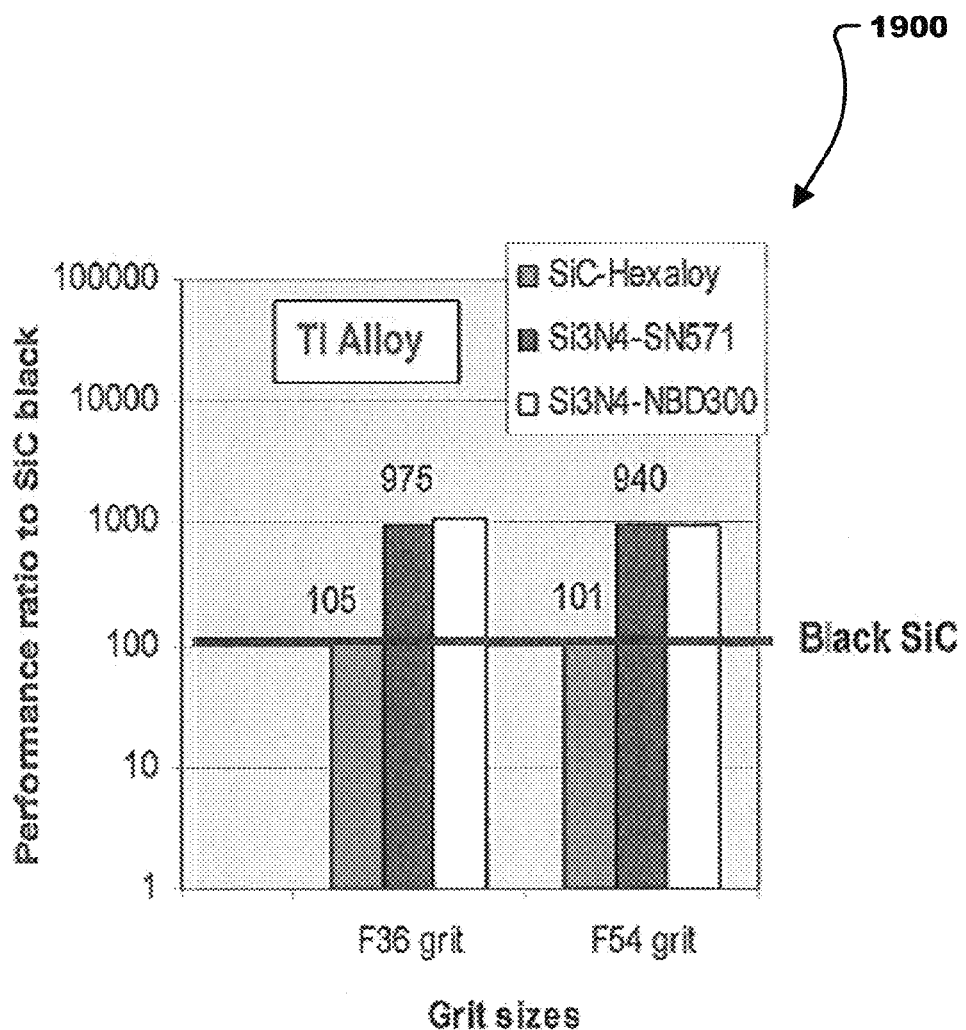
FIG. 19 includes a second bar chart illustrating a G-ratio for various bonded abrasive grinding wheels during grinding of a titanium alloy workpiece.

FIG. 18 includes a bar chart 1800 that illustrates a G-ratio for various bonded abrasive grinding wheels used to grind a white cast iron workpiece. A first grinding wheel includes Hexoloy® silicon carbide abrasive particles available from Saint-Gobain Corporation within a bond material. A second grinding wheel includes the silicon nitride particles of Example 1 contained within the bond material. A third grinding wheel includes silicon nitride particles, according to an embodiment herein, contained within the bond material. The first, second, and third grinding wheels each contain particles having a grit size of 36 mesh. The bond composition of the first, second, and third grinding wheels is substantially the same.

A fourth grinding wheel includes Hexoloy® silicon carbide abrasive particles available from Saint-Gobain Corporation within a bond material. A fifth grinding wheel includes the silicon nitride particles of Example 1 contained within the bond material. A sixth grinding wheel includes silicon nitride particles, according to an embodiment herein, contained within the bond material. The fourth, fifth, and sixth grinding wheels each contain particles having a grit size of 54 mesh. The bond composition of the fourth, fifth, and sixth grinding wheels is substantially the same.

G-ratios are determined for the grinding wheels by measuring the work piece material removal rate in relation to the weight loss from the grinding wheels under the test conditions described previously. As shown, the first grinding wheel has a G-ratio of about 122. The second grinding wheel has a G-ratio of about 1714. The third grinding wheel included a G-ratio of about 1000. The fourth grinding wheel has a G-ratio of about 100. The fifth grinding wheel has a G-ratio of about 2089. Finally, the sixth grinding wheel has a G-ratio of about 2090.

FIG. 19 includes a bar chart 1900 that illustrates a G-ratio for various bonded abrasive grinding wheels used to grind a titanium alloy workpiece under the test conditions described previously. A first grinding wheel includes Hexoloy® silicon carbide abrasive particles available from Saint-Gobain Corporation within a bond material. A second grinding wheel includes the silicon nitride particles of Example 1 contained within the bond material. A third grinding wheel includes silicon nitride particles, according to an embodiment herein, contained within the bond material. The first, second, and third grinding wheels each contain particles having a grit size of 36 mesh.

A fourth grinding wheel includes Hexoloy® silicon carbide abrasive particles available from Saint-Gobain Corporation within a bond material. A fifth grinding wheel includes the silicon nitride particles of Example 1 contained within the bond material. A sixth grinding wheel includes silicon nitride particles, according to an embodiment herein, contained within the bond material. The fourth, fifth, and sixth grinding wheels each contain particles having a grit size of 54 mesh.

As shown, the first grinding wheel has a G-ratio of about 105. The second grinding wheel has a G-ratio of about 975. The third grinding wheel has a G-ratio of about 1000. The fourth grinding wheel has a G-ratio of about 101. The fifth grinding wheel has a G-ratio of about 940. Finally, the sixth grinding wheel has a G-ratio of about 940.

Figure 20:
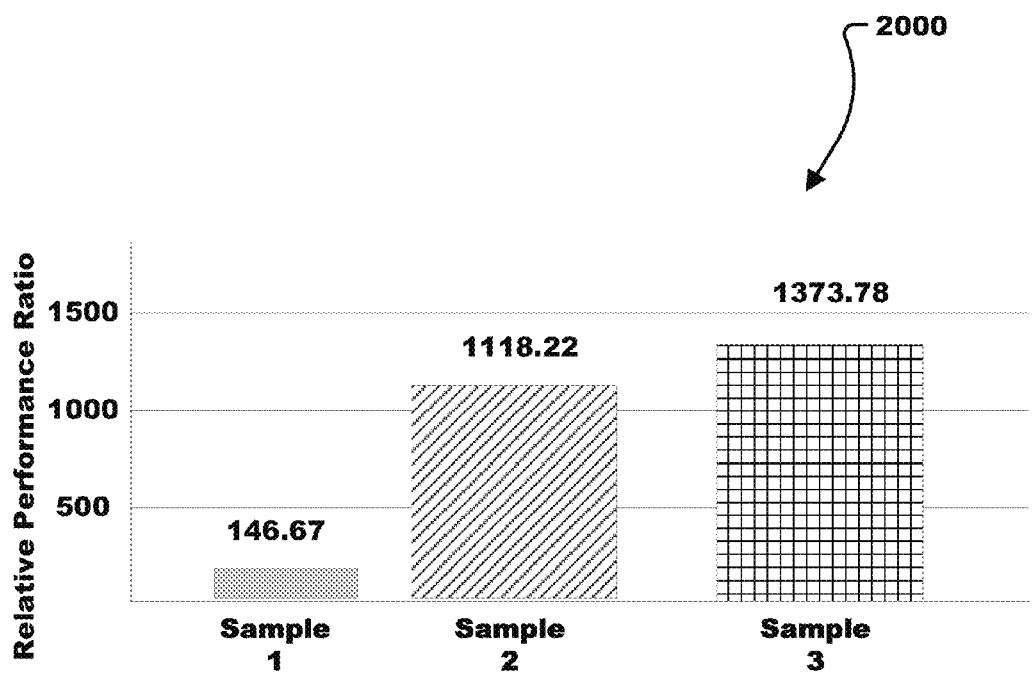
FIG. 20 includes a third bar chart illustrating a G-ratio for additional bonded abrasive grinding wheels during grinding of a titanium alloy workpiece.
Figure 21:
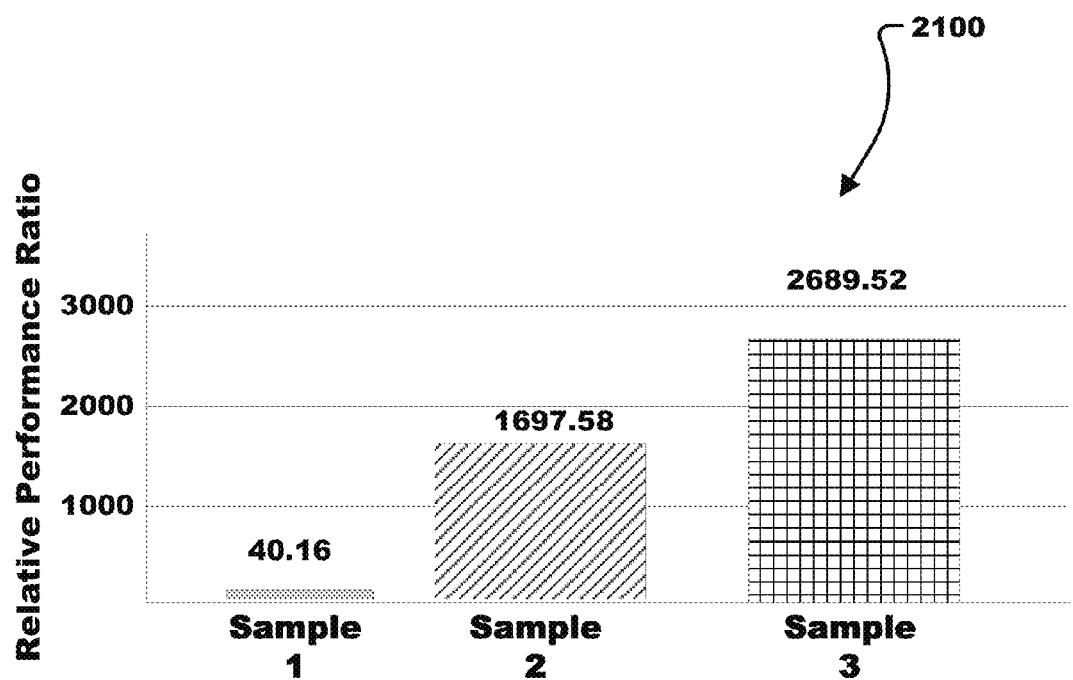
FIG. 21 includes a fourth bar chart illustrating a G-ratio for additional bonded abrasive grinding wheels during grinding of a white cast iron workpiece.

Additional testing is performed using a wet titanium alloy workpiece and a dry white cast iron workpiece placed on a 2-axis hydraulic surface grinding machine sold by Okamoto Corporation as model 6•18 DX. The table speed of the grinder is 60 feet/minute at an infeed (i.e., cut depth) of approximately 0.0005 inches for the titanium alloy workpiece and an infeed of approximately 0.0015 inches for the white cast iron workpiece. FIG. 20 includes a bar chart 2000 that illustrates the relative performance ratios of three grinding wheels that are used to wet grind the titanium alloy workpiece. FIG. 21 includes a bar chart 2100 that illustrates the relative performance ratios of three grinding wheels that are used to dry grind the white cast iron workpiece. The grinding operations are conducted until the abrasive grains are essentially depleted and the wheels longer cut. The relative performance ratio is also referred to herein as the G-ratio and is determined by measuring the work piece material removal rate in relation to the weight loss from the grinding wheels during the testing procedure.

The grinding operations are conducted with grinding wheels having silicon carbide abrasive grains and silicon nitride abrasive grains. The abrasive grains of the sample 1 wheels include silicon carbide grains that are formed according to a conventional process. The abrasive grains of the sample 2 wheels and the sample 3 wheels include silicon nitride grains that are formed according to processes described in embodiments herein. The process used to make the sample 2 abrasive grains varies from the process used to make the sample 3 abrasive grains in that AlN was not co-milled with the silicon nitride powder and other dry mixture materials when making the sample 3 abrasive grains, but AlN is added separately after milling the dry mixture. The average particle size of the silicon nitride powder used to make the abrasive grains of the sample 2-3 wheels is within a range of about 235 microns to about 450 microns.

The relative performance ratio illustrated in FIG. 20 for a sample 1 grinding wheel is about 146.67, while the relative performance ratio is about 1118.22 for a sample 2 grinding wheel and about 1373.78 for a sample 3 grinding wheel. As indicated in FIG. 21, the relative performance ratio for a sample 1 grinding wheel is about 40.16, the relative performance ratio for a sample 2 grinding wheel is about 1697.58, and the relative performance ratio for a sample 3 grinding wheel was about 2689.52.

The grinding wheels for samples 2 and 3 demonstrate remarkable and unexpected results compared to the results of the sample 1 grinding wheels. In particular, with respect to the grinding of a titanium alloy workpiece, the relative performance ratios of the sample 2 and sample 3 grinding wheels have an improvement of at least 7.5 times over the results from the sample 1 grinding wheel. Furthermore, with respect to the grinding of a white cast iron workpiece, the relative performance ratios of the sample 2 and sample 3 grinding wheels have an improvement of at least about 40 times over the results from the sample 1 grinding wheel.

The foregoing embodiments are directed to abrasive grains that represent a departure from the state-of-the-art and include silicon nitride abrasive grains that have improved performance over conventional silicon nitride abrasives and over other conventional abrasive grains, such as silicon carbide abrasive grains. As described in the present application, the silicon nitride abrasive grains have a combination of features that facilitate improved grinding performance. In particular, the silicon nitride abrasive grains described herein have a composition that provides a higher theoretical density and fewer pores when compared with conventional silicon nitride abrasive grains. For example, as illustrated in FIG. 6, the number of voids in the abrasive grains formed according to a conventional process is much higher than the number of voids in the abrasive grains formed according to embodiments described herein, which are illustrated in FIG. 2, FIG. 3, FIG. 4, and FIG. 5. It will be appreciated that the abrasive grain 300 illustrated in FIG. 3 corresponds to the abrasive grains included in the sample 2 grinding wheels and the abrasive grain 500 illustrated in FIG. 5 corresponds to the abrasive grains included in the sample 3 grinding wheels. Without being bound to a particular theory, the improved grinding performance of tools using silicon nitride abrasive grains formed as described herein can be attributed to the improved densification and toughness achieved due to the particular combination of features of the silicon nitride abrasive grains formed according to embodiments herein. The elongated nature of the silicon nitride abrasive grains formed according to embodiments described herein may also aid in the improved grinding performance over conventional silicon nitride abrasive grains. Furthermore, the processes used to form silicon nitride abrasive grains described in embodiments herein represent a departure from the state-of-the-art processes. In particular, conventional silicon nitride abrasive grain processes have been unable to effectively sinter the silicon nitride powders to achieve the densification and toughness needed for suitable grinding performance. However, the liquid phase sintering process described herein can be used to produce silicon nitride abrasive grains that have improved performance not only over other silicon nitride abrasive grains, but also over other conventional abrasive grains.

What is claimed is:
1. A shaped abrasive particle comprising:
a body having (i) a majority content of silicon nitride; and
(ii) a minority content of sintering material including $Nd_2O_3$ and $Y_2O_3$, wherein the shaped abrasive particle comprises a content (wt %) of $Nd_2O_3$ greater than a content (wt %) of $Y_2O_3$;
wherein the body of the shaped abrasive particle has a two-dimensional shape as viewed in a plane defined by a length and a width of the body; and
wherein the two-dimensional shape is selected from the group consisting of a polygonal shape, an ellipsoidal shape, a numeral, a Greek alphabet character, a Latin alphabet character, a Russian alphabet character, and a complex shape utilizing a combination of polygonal shapes.

2. The shaped abrasive particle of claim 1, wherein the body of the shaped abrasive particle is part of a coated abrasive article or a bonded abrasive article.

3. The shaped abrasive particle of claim 1, wherein the body of the shaped abrasive particle comprises no greater than 5 vol % porosity.

4. The shaped abrasive particle of claim 1, wherein a side face of the shaped abrasive particle is convex or concave.

5. The shaped abrasive particle of claim 1, wherein the shaped abrasive particle comprises a total content of rare earth oxide greater than a content of alumina.

6. The shaped abrasive particle of claim 1, wherein the shaped abrasive particle comprises no greater than 10 wt % of a dopant material.

7. The shaped abrasive particle of claim 6, wherein the dopant material is selected from the group consisting of an alkali element, an alkaline earth element, a rare earth element, hafnium, zirconium, niobium, tantalum, molybdenum, vanadium, or a combination thereof.

8. The shaped abrasive particle of claim 1, wherein the body of the shaped abrasive particle has a first height, $h_1$, at a first end of the body, and a second height, $h_2$ at a second end of the body opposite the first end, and wherein $h_1$ is different than $h_2$.

9. The shaped abrasive particle of claim 1, wherein the shaped abrasive particle comprises a majority content (>50 wt %) of beta-phase silicon nitride.

10. The shaped abrasive particle of claim 1, wherein the shaped abrasive particle has a base surface and an upper surface, and wherein the base surface has a planar shape different than a planar shape of the upper surface.

11. The shaped abrasive particle of claim 1, wherein the shaped abrasive particle has a center of mass and a geometric midpoint, and wherein the center of mass is disposed at a different location than the geometric midpoint.

12. The shaped abrasive particle of claim 1, wherein the shaped abrasive particle has a twist angle rotatably offsetting opposing end faces of the shaped abrasive particle, the twist angle being less than 360°.

13. The shaped abrasive particle of claim 1, wherein the shaped abrasive particle has:
 an aspect ratio of length:width of at least 1:1,
 an aspect ratio of height:width of at least 0.5:1,
 an aspect ratio of length:height of at least 1:1, or
 a combination thereof.

14. The shaped abrasive particle of claim 1, wherein the shaped abrasive particle further comprises a sintering aid.

15. The shaped abrasive particle of claim 14, wherein the sintering aid comprises an oxide selected from the group consisting of $Al_2O_3$, MgO, $TiO_2$, AlN, or a combination thereof.

16. The shaped abrasive particle of claim 14, wherein the sintering aid comprises no greater than 13.2 wt % of the shaped abrasive particle.

17. The shaped abrasive particle of claim 1, wherein the shaped abrasive particle comprises a polyhedron.

18. A batch of shaped abrasive particles comprising:
 a plurality of shaped abrasive particles, wherein each shaped abrasive particle of the plurality of shaped abrasive particles comprises:
  a body having (i) a majority content of silicon nitride; and (ii) a minority content of sintering material including $Nd_2O_3$ and $Y_2O_3$, wherein the shaped abrasive particle comprises a content (wt %) of $Nd_2O_3$ greater than a content (wt %) of $Y_2O_3$;
  wherein the body of the shaped abrasive particle has a two-dimensional shape as viewed in a plane defined by a length and a width of the body; and
 wherein the two-dimensional shape is selected from the group consisting of a polygonal shape, an ellipsoidal shape, a numeral, a Greek alphabet character, a Latin alphabet character, a Russian alphabet character, and a complex shape utilizing a combination of polygonal shapes.

* * * * *